US010032152B2

(12) United States Patent
Kawamori et al.

(10) Patent No.: US 10,032,152 B2
(45) Date of Patent: Jul. 24, 2018

(54) TRANSMISSION SYSTEM THAT ENABLES CORRELATION BETWEEN A SENDING DEVICE AND EACH OF MULTIPLE RECEIVING DEVICES

(71) Applicant: Seiko Epson Corporation, Tokyo (JP)

(72) Inventors: Takashi Kawamori, Shiojiri (JP); Satoru Nakayama, Ueda (JP); Shigeru Aoki, Shiojiri (JP); Naohiro Kaneko, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 171 days.

(21) Appl. No.: 14/516,897

(22) Filed: Oct. 17, 2014

(65) Prior Publication Data

US 2015/0113049 A1   Apr. 23, 2015

(30) Foreign Application Priority Data

Oct. 22, 2013 (JP) ................. 2013-218960
Oct. 22, 2013 (JP) ................. 2013-218961
Oct. 22, 2013 (JP) ................. 2013-219173
Oct. 22, 2013 (JP) ................. 2013-219174
Oct. 22, 2013 (JP) ................. 2013-219175

(51) Int. Cl.
   *G06F 15/16*   (2006.01)
   *G06Q 20/20*   (2012.01)
   *H04L 29/08*   (2006.01)
   *G07G 1/14*    (2006.01)

(52) U.S. Cl.
   CPC ....... *G06Q 20/202* (2013.01); *H04L 67/1097* (2013.01); *G07G 1/14* (2013.01)

(58) Field of Classification Search
   CPC ..... G06Q 20/202; G07G 1/14; H04L 67/1097
   See application file for complete search history.

(56) References Cited

U.S. PATENT DOCUMENTS

| 8,150,920 B2 * | 4/2012 | Forstadius ........ G06F 17/30905 |
| | | 709/205 |
| 9,225,730 B1 * | 12/2015 | Brezinski ................ G06F 21/00 |
| 2002/0143957 A1 | 10/2002 | Tanimoto |

(Continued)

FOREIGN PATENT DOCUMENTS

| CN | 101674257 A | 3/2010 |
| EP | 1959341 A1 | 8/2008 |

(Continued)

*Primary Examiner* — Mohamed A Wasel
(74) *Attorney, Agent, or Firm* — Foley & Lardner LLP

(57) ABSTRACT

A transmission system includes a data supply device that transmits data, a transmission device that receives such data, and multiple receiving devices, at least one of which receives the data sent by the transmission device. The transmission device includes a transmission unit that sends the data to one or more of the receiving devices, and a storage unit having a storage area associated with the one or more receiving devices and which stores data relationally to each such receiving device. The transmission unit further includes a data control unit that, upon storing the data sent by the data supply device in the storage area associated with the receiving device(s), sends the data to the appropriate receiving device(s) and processes a report sent from each receiving device that received data.

19 Claims, 21 Drawing Sheets

(56) References Cited

U.S. PATENT DOCUMENTS

| | | | |
|---|---|---|---|
| 2004/0156495 A1* | 8/2004 | Chava | H04L 45/00 379/392 |
| 2004/0177004 A1* | 9/2004 | Mueller | G06Q 20/20 705/15 |
| 2005/0038705 A1* | 2/2005 | Yamada | G06Q 20/20 705/16 |
| 2006/0007957 A1* | 1/2006 | Pihlajamaki | H04L 12/189 370/471 |
| 2006/0261161 A1* | 11/2006 | Murofushi | G06Q 20/20 235/383 |
| 2008/0011844 A1* | 1/2008 | Tami | G06Q 20/204 235/385 |
| 2008/0250017 A1 | 10/2008 | Best et al. | |
| 2009/0259516 A1* | 10/2009 | Zeevi | G06Q 30/02 705/14.65 |
| 2009/0262382 A1* | 10/2009 | Nobutani | H04L 12/10 358/1.15 |
| 2010/0014437 A1* | 1/2010 | Wang | G06F 11/0745 370/252 |
| 2010/0094810 A1 | 4/2010 | Ishibashi | |
| 2011/0087535 A1* | 4/2011 | Yoshizawa | G06Q 20/20 705/14.26 |
| 2013/0111572 A1* | 5/2013 | Gaddam | H04W 12/06 726/7 |
| 2014/0125800 A1* | 5/2014 | Van Nest | G07G 3/003 348/143 |
| 2014/0249942 A1* | 9/2014 | Hicks | G07G 1/0081 705/17 |

FOREIGN PATENT DOCUMENTS

| | | |
|---|---|---|
| JP | 61-069255 | 4/1986 |
| JP | 63-104196 A | 5/1988 |
| JP | 03-269656 | 12/1991 |
| JP | 05-183720 A | 7/1993 |
| JP | 09-016417 A | 1/1997 |
| JP | 2000-341434 A | 12/2000 |
| JP | 2001-177560 A | 6/2001 |
| JP | 2002-084308 | 3/2002 |
| JP | 2002-300202 | 10/2002 |
| JP | 2002-319982 | 10/2002 |
| JP | 2003-016019 A | 1/2003 |
| JP | 2003-085030 | 3/2003 |
| JP | 2004-241973 | 8/2004 |
| JP | 2008-028494 A | 2/2008 |
| JP | 2008-084197 A | 4/2008 |
| JP | 2008-198122 | 8/2008 |
| JP | 2008-262561 | 10/2008 |
| JP | 2009-272681 | 11/2009 |
| JP | 2010-074393 | 4/2010 |
| JP | 2011-159057 | 8/2011 |
| JP | 2012-182744 | 9/2012 |

\* cited by examiner

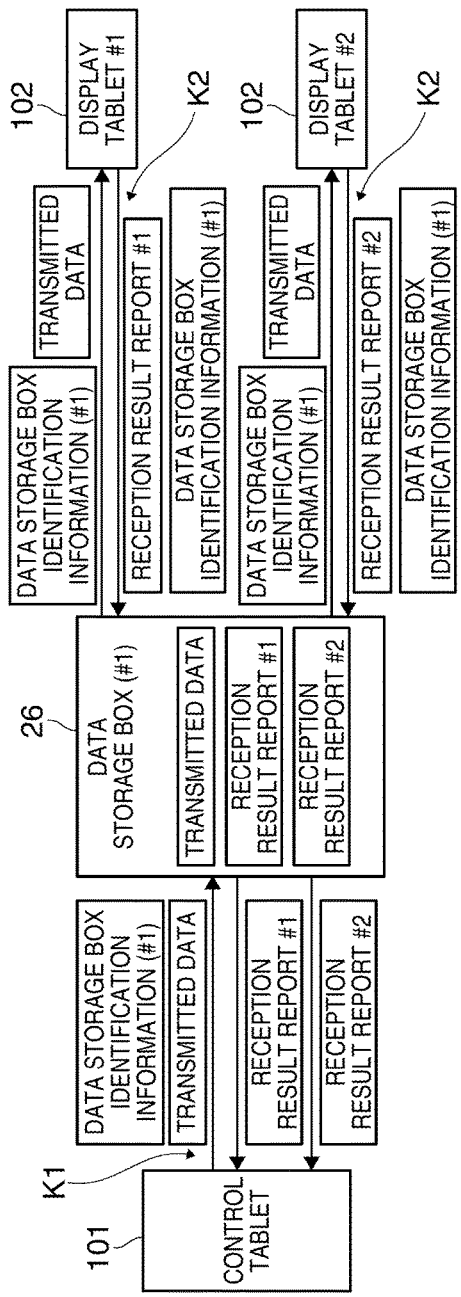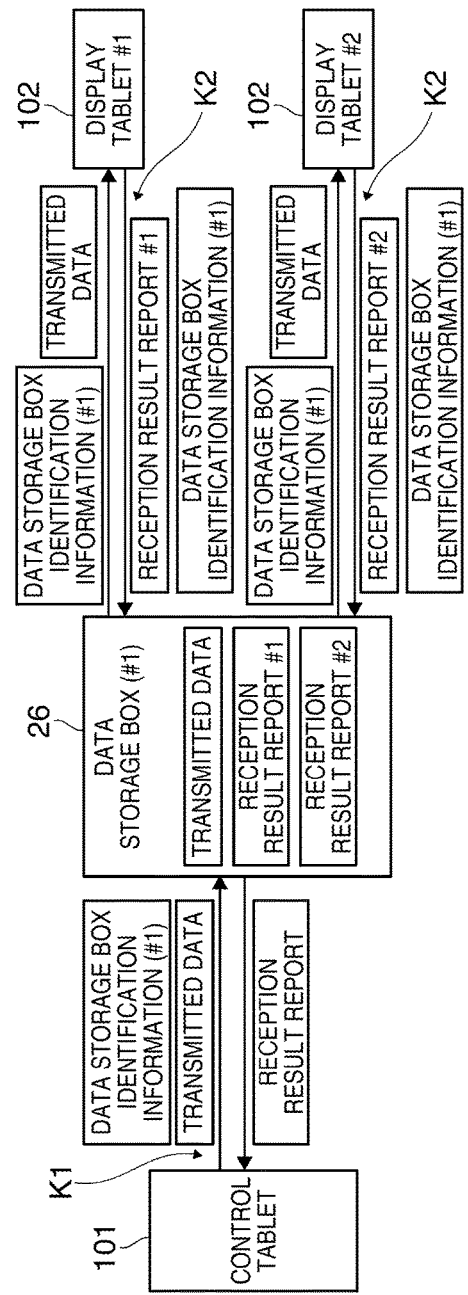
FIG. 4A
FIG. 4B

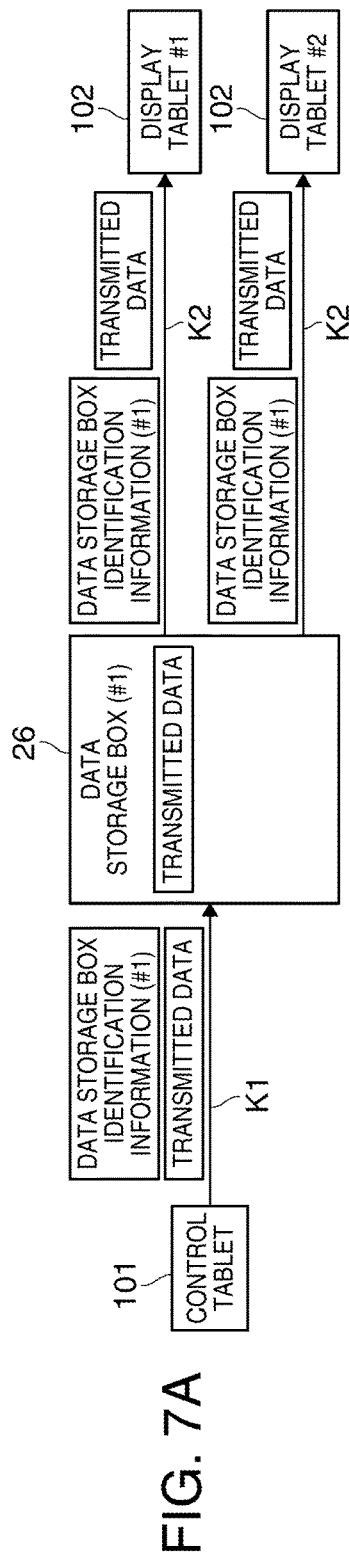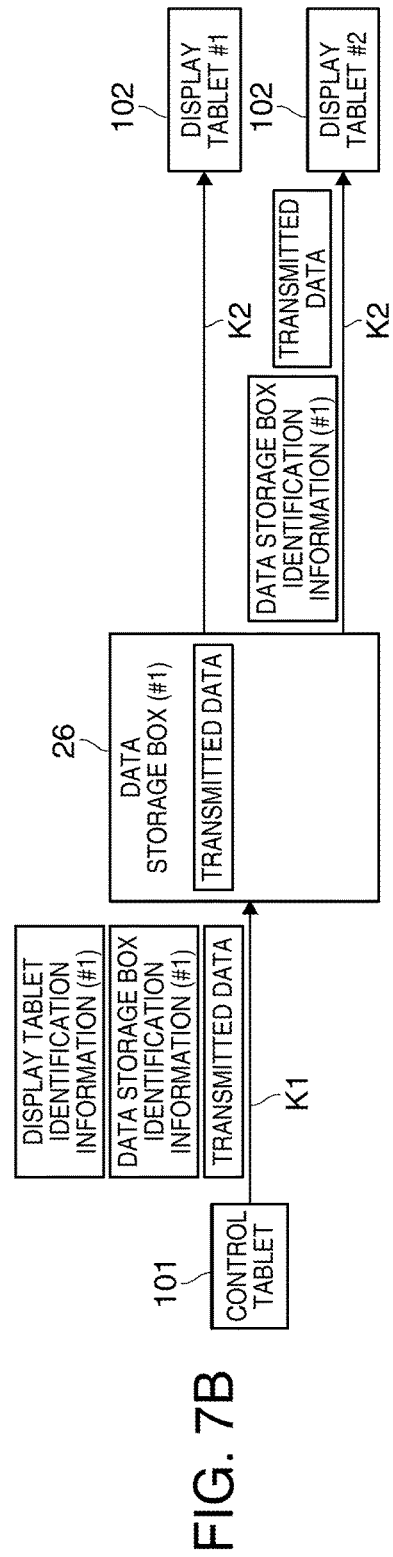

TRANSMISSION SYSTEM THAT ENABLES CORRELATION BETWEEN A SENDING DEVICE AND EACH OF MULTIPLE RECEIVING DEVICES

Priority is claimed under 35 U.S.C. § 119 to Japanese Application nos. 2013-219173 filed Oct. 22, 2013, 2013-218960 filed Oct. 22, 2013, 2013-218961 filed Oct. 22, 2013, 2013-219174 filed Oct. 22, 2013 and 2013-219175 filed Oct. 22, 2013 are hereby incorporated by reference in their entirety.

BACKGROUND

1. Technical Field

The present disclosure relates to a transmission system, a transmission device, and a data transmission method.

2. Related Art

Two-way communication using the WebSocket standard is one method of exchanging data between a plurality of devices as described in JP-A-2012-182744. Each time data is stored in the storage unit of the server in the configuration disclosed in JP-A-2012-182744, data is sent from the server to a client device. This configuration enables transmitting data without the client device requesting data from the server.

However, when data is transmitted without the device on the side that receives the data asserting a request for the data, it is not easy to determine which client device the data should be sent to because the receiving side does not request the data. The connection between the devices must therefore be simple to unconditionally determine the device to which data is sent, for example, such as by a 1:1 connection between the sending device and the receiving device, as described in JP-A-2012-182744. The relationship between the sending device and the receiving device is therefore limited with the technology of the related art.

In a system in which a server device transmits data, processes such as resending data that was already sent is normally controlled by the server. In this event, the server must store the transmitted data. As a result, achieving a configuration that can respond to retransmission requests from a client is difficult.

SUMMARY

When communicating data between devices, the present invention enables controlling the correlation between the sending device and the receiving device with a high degree of freedom, and executing processes appropriate to the receiving device.

To achieve the foregoing object, a transmission system according to one aspect of the invention has a data supply device that transmits data; a transmission device that receives the data sent by the data supply device; and a receiving device that receives the data sent by the transmission device. The transmission device includes a transmission unit that sends the data to the receiving device; a storage unit with a storage area that stores the data relationally to the receiving device; and a data control unit that stores the data sent by the data supply device in the storage area, sends the data to the receiving device related to the storage area, and processes a report sent from the receiving device.

In this aspect of the invention, the transmission device can send data sent by the data supply device to the receiving device, and can process a report sent by the receiving device. As a result, sending data to the receiving device can be simplified.

In a transmission system according to another aspect of the invention, the data control unit of the transmission device stores the data sent by the data supply device in the storage area, sends the data to the receiving device related to the storage area, and controls sending to the data supply device a result report indicating the result of sending the data based on a report sent from the receiving device.

In this configuration, data sent by the data supply device is sent by the transmission device to the receiving device, and a result report indicating the result of transmission is sent to the data supply device. As a result, sending data to the receiving device can be simplified. The data supply device can also manage the results of transmitting to the receiving device.

In a transmission system according to another aspect of the invention, the data control unit sends data identifying the storage area related to the receiving device to the receiving device; and the receiving device sends the report to the transmission device based on the transmitted data identifying the storage area.

In this configuration, the receiving device transmits a reception result report based on data identifying the storage area, and the results of sending data to the receiving device can be managed relationally to the storage area.

A transmission system according to another aspect of the invention also has a second receiving device that receives data. The storage area is related to the second receiving device; and when the data supply device specifies the storage area and transmits the data, the data control unit sends the data to the receiving device and the second receiving device related to the storage area, generates the result report based on the report sent from the receiving device and a second report sent from the second receiving device, and sends the generated result report to the data supply device.

In this configuration data transmitted by the data supply device can be sent to plural receiving devices, and the results of sending data to plural receiving devices can be managed.

In a transmission system according to another aspect of the invention, the receiving device has a process unit that receives and processes data, and a response command transmission unit that sends a response command, which is a report indicating the result of the process unit processing the data; the transmission unit of the transmission device receives the data transmitted by the data supply device, and sends the data to the receiving device; and when the data control unit stores the data sent by the data supply device in the storage area, the data control unit transmits the data stored in the storage area to the receiving device related to the storage area, and processes the data stored in the storage area according to the response command the receiving device transmits in response to the transmission from the data control unit.

In this configuration, sending data transmitted from the data supply device to a receiving device can be simplified. Furthermore, by relating the storage areas and receiving devices, the correlation between sending devices and receiving devices can be controlled with a high degree of freedom. In addition, data stored in the storage area can be resent, deleted, or otherwise processed according to a request from the receiving device, and user convenience can be improved.

In a transmission system according to another aspect of the invention, the data control unit reports processing the data to the receiving device when data stored in the storage area is processed according to the response command sent by the receiving device.

This configuration enables processing data stored in the storage area, and the receiving device, for example, can be informed of the process result.

A transmission system according to another aspect of the invention also has a second receiving device having a second process unit that receives and processes data, and a second response command transmission unit that sends a response command, which is a report indicating the result of the second process unit processing the data. The storage area is related to the second receiving device; and the data control unit processes the data stored in the storage area according to the second response command when the second receiving device sends the second response command.

This configuration can relate plural receiving devices to a storage area, and data stored in the storage area can be processed appropriately according to a response command sent by any of the receiving devices.

In a transmission system according to another aspect of the invention, the response command includes information related to the data; and the data control unit reports to the receiving device that the specified data is not stored when the response command is received and the data corresponding to the information related to the data of the response command is not stored in the storage area.

This configuration can inform the recording device that there is no data to process when, for example, data stored in the storage area has already been deleted based on a response command sent by a receiving device.

In a transmission system according to another aspect of the invention, the response command is an instruction to resend the data; and the data control unit sends the data to the receiving device according to the response command.

This configuration can resend data stored in a storage area to the transmission device as a result of the receiving device sending a response command.

In a transmission system according to another aspect of the invention, the response command is an instruction to delete the data; and the data control unit deletes the data stored in the storage area related to the receiving device from the storage area according to the response command.

This configuration can cause the transmission device to delete data stored in a storage area as a result of the receiving device sending a response command.

In a transmission system according to another aspect of the invention, the receiving device has a reception unit that receives the data, a process unit that processes the data received by the reception unit, and a transmission unit that sends result data, which is a report of the result of the process unit processing the data; the transmission unit of the transmission device has a first connection unit that receives the data from the data supply device and sends the result data to the data supply device, and a second connection unit that sends the data to the receiving device and receives the result data; and the storage unit has a storage area that stores the data and the result data relationally to the data supply device and the receiving device.

When the data supply device transmits data in this configuration, the transmission device receives and sends the data to the receiving device, and the receiving device sends result data based on the received data to the transmission device. The result data sent by the receiving device, and the data received from the data supply device and sent to the receiving device, are stored in the storage area of the transmission device. As a result, sending data from the data supply device to the receiving device can be simplified by using the storage area of the transmission device. In addition, because result data is sent to the data supply device, the data supply device can manage the results of processing by the receiving device.

In a transmission system according to another aspect of the invention, the transmission device transmits the result data as a process result of the data to the data supply device when the result data is received after the data stored in the storage area is sent to the receiving device.

In this configuration, the data supply device can manage the results of processing by the receiving device.

In a transmission system according to another aspect of the invention, the data supply device specifies the storage area and sends the data; and the transmission device sends the result data to the data supply device when the result data is stored in the storage area.

In this configuration, data can be sent to the receiving device related to a particular storage area because the data supply device specifies the storage area when sending data. The receiving device can also send result data to the storage area, and this result data is sent through the storage area to the data supply device. As a result, sending data from the data supply device to the receiving device can be simplified, and the data supply device can manage the result of processing the transmitted data.

A transmission system according to another aspect of the invention also has a second receiving device that is related to the storage area and has a second process unit that receives and processes the data. The data stored in the storage area is sent to the receiving device and the second receiving device, and the storage area stores the result data of the receiving device and the second result data of the second receiving device.

In this configuration, the data sent by the data supply device is sent through the storage area to plural receiving devices, and the data supply device can manage the result of processing by the receiving device.

In a transmission system according to another aspect of the invention, the receiving device receives the data and executes a process; and when the data supply device specifies the storage area and sends the data, the data control unit of the transmission device stores the data in the specified storage area and sends the data stored in the storage area to the receiving device related to the storage area.

This configuration simplifies sending data to the receiving device, and can determine the receiving device to which data is sent with a high degree of freedom.

A transmission system according to another aspect of the invention also has a second receiving device that receives and processes the data. When the storage area is related to the receiving device and to the second receiving device, the data control unit sends the data stored in the storage area to the receiving device and the second receiving device.

In this configuration, when the data supply device specifies a storage area and transmits data, the transmitted data is sent to the receiving device and the second receiving device. As a result, sending data from the data supply device to the receiving devices can be further simplified.

In a transmission system according to another aspect of the invention, the data supply device transmits a command instructing instantiating a storage area to store transmitted data; the transmission device has a data communication unit that receives the command the data supply device sent; and the data control unit of the transmission device instantiates the storage area that stores the data sent from the data supply device based on the command.

In this configuration, the transmission device instantiates a storage area, and data stored in the storage area is sent to another device, as a result of a command sent by the data supply device. As a result, the transmission device can send data sent by the data supply device to another device. The transmission device can therefore control the correlation between the data supply device and the device that receives the data sent by the data supply device, sending data can be simplified, and the device to which data is sent can be controlled with a high degree of freedom.

In a transmission system according to another aspect of the invention, the receiving device has a reception unit that receives the data sent by the transmission device, and a process unit that processes the data received by the reception unit; the storage area of the transmission device has identification information that identifies the storage area; and the receiving device is related to the storage area having the identification information.

In this configuration, the receiving device is related to the storage area instantiated by a command sent by the data supply device, and data stored in that storage area is sent to the receiving device. The correlation between the data supply device and the receiving to which data is sent can therefore be controlled with a high degree of freedom.

In a transmission system according to another aspect of the invention, the result report generated by the data control unit is a single result report generated from the report and the second report.

This configuration can simplify managing transmission results when the data transmitted by the data supply device is sent to plural receiving devices.

In a transmission system according to another aspect of the invention, the result report generated by the data control unit is a second result report generated from the first result report generated based on the report, and the second report.

In this configuration, when data sent by the data supply device is sent to plural receiving devices, the transmission results on the plural receiving devices can be managed individually.

In a transmission system according to another aspect of the invention, the transmission device sends process result data based on the result data and the second result data to the data supply device.

By receiving the process result data sent by the transmission device, the data supply device in this configuration can manage the results of processing by the receiving device and the second receiving device.

In a transmission system according to another aspect of the invention, the transmission device sends the result data and the second result data to the data supply device.

By receiving the result data and the second result data sent by the transmission device, the data supply device in this configuration can separately manage the results of processing by the receiving device and the second receiving device.

A transmission system according to another aspect of the invention has a data supply device that transmits data; a receiving device that receives and processes the data; and a transmission device. The transmission device has a reception unit that receives the data sent by the data supply device; a storage unit with a storage area that stores the data relationally to the receiving device; and a data control unit that, when the data supply device specifies the storage area and transmits data, stores the data in the specified storage area, and sends the data stored in the storage area to the receiving device related to the storage area.

This configuration simplifies sending data to the receiving device, and can determine the receiving device to which data is sent with a high degree of freedom.

A transmission system according to another aspect of the invention also has a second receiving device that receives and processes the data.

In this configuration, the correlation between the transmission-side data supply device and the receiving device can be controlled with a high degree of freedom. Sending data from the data supply device to the receiving device can also be further simplified.

In a transmission system according to another aspect of the invention, when the storage area is related to a receiving device and a second receiving device, the data control unit sends the data stored in the storage area to the receiving device and the second receiving device.

In this configuration, when the data supply device specifies a storage area and transmits data, the transmitted data is sent to the receiving device and the second receiving device. As a result, sending data from the data supply device to the receiving device can be further simplified.

In a transmission system according to another aspect of the invention, when the data supply device specifies the storage area and second receiving device and transmits data, the data control unit sends the data stored in the storage area to the second receiving device.

This configuration can control the relationship between the sending-side data supply device and the receiving device with a high degree of freedom.

In a transmission system according to another aspect of the invention, the storage unit has a second storage area that is different from the storage area, and when the second storage area is not related to the data supply device, the data control unit does not send the data to the second storage area if the data supply device specifies the second storage area and transmits the data.

This configuration stores data transmitted by the data supply device related to a storage area in the storage area, and transmits to the receiving device. As a result, security can be improved by restricting the data supply devices that can transmit data.

A transmission system according to another aspect of the invention has: a data supply device including a communication unit that transmits a command instructing instantiating a storage area to store transmitted data; and a transmission device. The transmission device has a data communication unit that receives commands transmitted by the communication unit of the data supply device; a data control unit that instantiates the storage area storing the data sent from the data supply device based on the command; a storage unit in which the storage area is instantiated; and a transmission unit that transmits the data stored in the storage area.

In this configuration, the transmission device instantiates the storage area, and data stored in this storage area is transmitted to another device, based on the command transmitted by the data supply device. As a result, the transmission device can send the data the data supply device transmits to another device. The transmission device can therefore control the relationship between the data supply device and the device that receives data sent by the data supply device, data transmission can be simplified, and the device to which data is transmitted can be controlled with a high degree of freedom.

A transmission system according to another aspect of the invention also has a receiving device including a sending and receiving unit that receives the data transmitted by the transmission device, and a process unit that processes the data received by the sending and receiving unit; the storage area of the transmission device has identification information that identifies the storage area; and the receiving device is related to the storage area having the identification information.

In this configuration, the receiving device is related to the storage area instantiated by a command sent by the data supply device, and data stored in that storage area is sent to the receiving device. The correlation between the data supply device and the receiving to which data is sent can therefore be controlled with a high degree of freedom.

In a transmission system according to another aspect of the invention, the data supply device has a storage unit that stores unique information assigned to the data supply device; and the command includes the unique information.

Because the command sent by the data supply device includes the unique information of the data supply device, a storage area can be related to a data supply device, the relationship between the data supply device and the receiving device to which data is transmitted can be controlled with a high degree of freedom.

In a transmission system according to another aspect of the invention, after the process unit of the receiving device processes data, the sending and receiving unit specifies a storage area with the identification information, and sends the result of processing the data to the storage area of the transmission device.

In this configuration, the transmission device can manage the results of the receiving device processing data.

In a transmission system according to another aspect of the invention, when the result of processing data is transmitted, and a storage area with the identification information is not instantiated in the storage unit of the transmission device, the receiving device sends a second command to the transmission device to instantiate a storage area with the identification information in the storage unit.

In this configuration, because the receiving device sends a command to instantiate the storage area, the result of the receiving device processing data can be stored in the storage area even when the storage area has not been instantiated.

In a transmission system according to another aspect of the invention, after the storage area is instantiated based on the command, the data supply device specifies the storage area using the identification information of the storage area when sending data.

In this configuration, the correlation between the data supply device and the receiving device to which data is transmitted can be controlled with a high degree of freedom by the data supply device specifying the storage area when sending data.

Another aspect of the invention is a transmission device including: a transmission unit that transmits data to an external receiving device; a storage unit with a storage area that stores the data and is related to a receiving device; and a data control unit that stores the data the external data supply device sends in the storage area, transmits the data to the receiving device related to the storage area, and processes a report sent from the receiving device.

In this configuration, the transmission device can send data transmitted by the data supply device to the receiving device, and can process reports sent by the receiving device. Sending data to the receiving device can therefore be simplified.

A transmission device according to another aspect of the invention has a communication unit that sends data to a receiving device; a storage unit with a storage area that stores the data relationally to the receiving device; and a data control unit that stores the data received by the communication unit in the storage area, sends the data to the receiving device related to the storage area, and controls sending a result report indicating the result of sending the data based on a report sent from the receiving device.

This configuration sends data received by the communication unit to the receiving device, and outputs a result report indicating the result of sending data to the receiving device. As a result, data received by the communication unit can be easily sent to the receiving device. In addition, the result of data transmission to the device that transmitted data to the transmission device can be reported.

A transmission device according to another aspect of the invention has a sending and receiving unit that receives and transmits data; a storage unit in which is instantiated a storage area that stores data relationally to a first external device that sends the data to the sending and receiving unit, and a second external device to which data is transmitted from the sending and receiving unit; and a data control unit that transmits the data stored in the storage area to the second external device related to the storage area when the data control unit stores the data sent by the first external device in the storage area, and processes the data stored in the storage area according to the response command the second external device transmits in response to the transmission from the data control unit.

In this configuration, data that the transmission device receives from the first external device and stores in the storage area is transmitted to a second external device related to the storage area, and data is processed according to the response command of the second external device. As a result, sending data transmitted by the first external device to the second external device can be simplified. By relating the storage area to the second external device, the correlation between the sending-side first external device and the receiving-side second external device can be controlled with a high degree of freedom. In addition, data stored in the storage area can be resent, deleted, or otherwise processed according to a request from the receiving device, and user convenience can be improved.

The transmission device according to another aspect of the invention has a first connection unit that receives data and sends the result data indicating the process result based on the data to the first external device; a second connection unit that sends the data to the second external device and receives the result data; and a storage unit having a storage area that stores the data and the result data relationally to the first external device and the second external device.

In this configuration, the first external device receives the transmitted data and sends the received data to the second external device, and the second external device stores and sends the result data to the first external device. Sending data from the first external device to the second external device is therefore simple using this storage area, and sending result data from the second external device can be simplified.

A transmission device according to another aspect of the invention has a transmission unit that transmits data; a storage unit with a storage area that stores the data and is related to a receiving device; and a data control unit that controls storing data from an external device in the storage area, and when the data is stored in the storage area, sends the data stored in the storage area to the receiving device related to the storage area.

This configuration simplifies sending data to the receiving device, and can control the receiving device to which data is sent with a high degree of freedom.

A transmission device according to another aspect of the invention has a data communication unit that receives commands transmitted by the communication unit of a data supply device; a data control unit that instantiates a storage area to store the data transmitted from the data supply device based on the command; a storage unit in which the storage area is instantiated; and a transmission unit that transmits the data stored in the storage area.

The transmission device in this configuration instantiates a storage area based on a command sent by the data supply device, and transmits data stored in this storage area. As a result, the transmission device can send data transmitted by the data supply device to another device. As a result, the transmission device can control the correlation between the data supply device and the device that receives the data transmitted by the data supply device, data transmission can be simplified, and the device to which data is sent can be controlled with a high degree of freedom.

Another aspect of the invention is a data transmission method, including: receiving data from an external data supply device; storing the received data in a storage area that is related to a receiving device that receives data, and stores the data; and sending the data stored in the storage area to the receiving device related to the storage area, and processing a report sent from the receiving device.

In this aspect of the invention, data sent by the data supply device can be sent to the receiving device, and a report sent by the receiving device can be processed. As a result, sending data to the receiving device can be simplified.

Another aspect of the invention is a data transmission method including: acquiring data including information specifying a storage area from an external device; storing the data in the storage area related to the receiving device based on the information specifying the storage area; transmitting data stored in the storage area to the receiving device related to the storage area when the data is stored in the storage area; processing the data based on the transmitted data; generating a report indicating the result of processing the data; and sending the generated result report to the external device.

In this configuration, the data transmitted from the external device is sent to the receiving device, and a result report indicating the result of transmission is sent to the external device. As a result, sending data to the receiving device can be simplified. The external device can also manage the results of data transmissions to the receiving device.

A data processing method according to another aspect of the invention includes: receiving data transmitted by a data supply device; storing the received data in a storage area related to the data supply device and a receiving device; sending the data stored in the storage area to the receiving device related to the storage area; receiving the data with the receiving device; executing a process based on the received data and outputting response data indicating the process result; receiving the response data that was transmitted; and processing data stored in the storage area related to the receiving device that transmitted the response data according to the received response data.

In this configuration, data that the transmission device receives from the data supply device and stores in the storage area is transmitted to the receiving device related to the storage area. The data stored in the storage area is processed according to the response command sent by the receiving device. As a result, sending data transmitted by the data supply device to the receiving device can be simplified. By relating the storage area and the receiving device, the correlation between the sending device and the receiving device can be controlled with a high degree of freedom. In addition, data stored in the storage area can be resent, deleted, or otherwise processed according to a request from the receiving device, and user convenience can be improved.

A data transmission method according to another aspect of the invention includes: receiving data including information specifying a storage area from the data supply device; storing the data in the specified storage area; sending the data stored in the storage area to the receiving device related to the storage area; processing the data with the receiving device; sending result data indicating the result of data processing by the receiving device to the storage area; and sending the result data stored in the storage area to the data supply device that specified the storage area.

In this configuration, data transmitted by the data supply device is transmitted by the transmission device to the receiving device, and result data based on the data received by the receiving device is sent to the transmission device. By thus using a storage area on the transmission device, sending data from the data supply device to the receiving device can be simplified. The data supply device can also manage the result of processing by the receiving device.

A data transmission method according to another aspect of the invention includes: acquiring data including information specifying a storage area; storing the data in the storage area based on the information specifying a storage area; and when storing data in the storage area, sending the data stored in the storage area to the receiving device related to the storage area.

This aspect of the invention simplifies sending data to a receiving device, and can control the receiving device to which data is transmitted with a high degree of freedom.

A data transmission method according to another aspect of the invention includes: receiving a command to instantiate a storage area to store data in a storage unit; instantiating the storage area in the storage unit based on the command; storing the data in the storage area when data is received from the device that sent the command; and sending the stored data to the receiving device related to the storage area.

In this configuration, a storage area is instantiated based on a command, and data stored in the storage area is transmitted to a receiving device. As a result, the correlation between the device transmitting data and the receiving device that receives the data can be controlled with a high degree of freedom.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 4A and 4B illustrate the data communication operation.

FIGS. 7A and 7B illustrate the data communication operation in a second embodiment of the invention.

DESCRIPTION OF EMBODIMENTS

Embodiment 1

Figure 1:
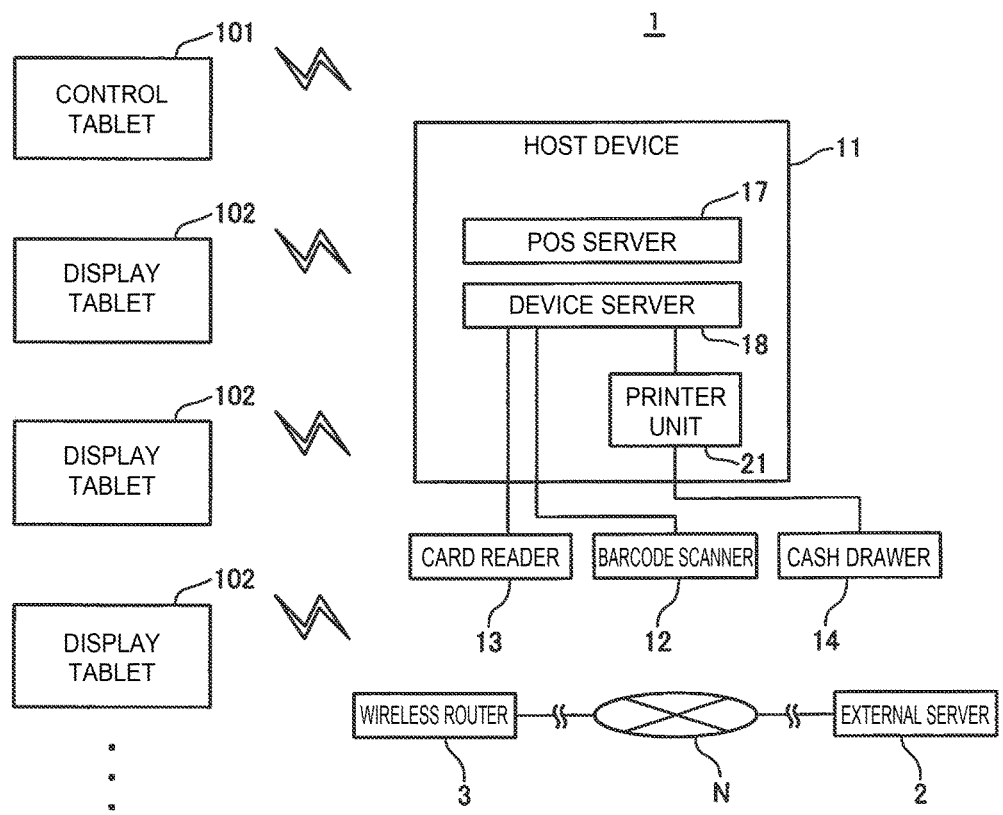
FIG. 1 is a block diagram showing an example of the configuration of a POS system according to a first embodiment of the invention.
Figure 2:
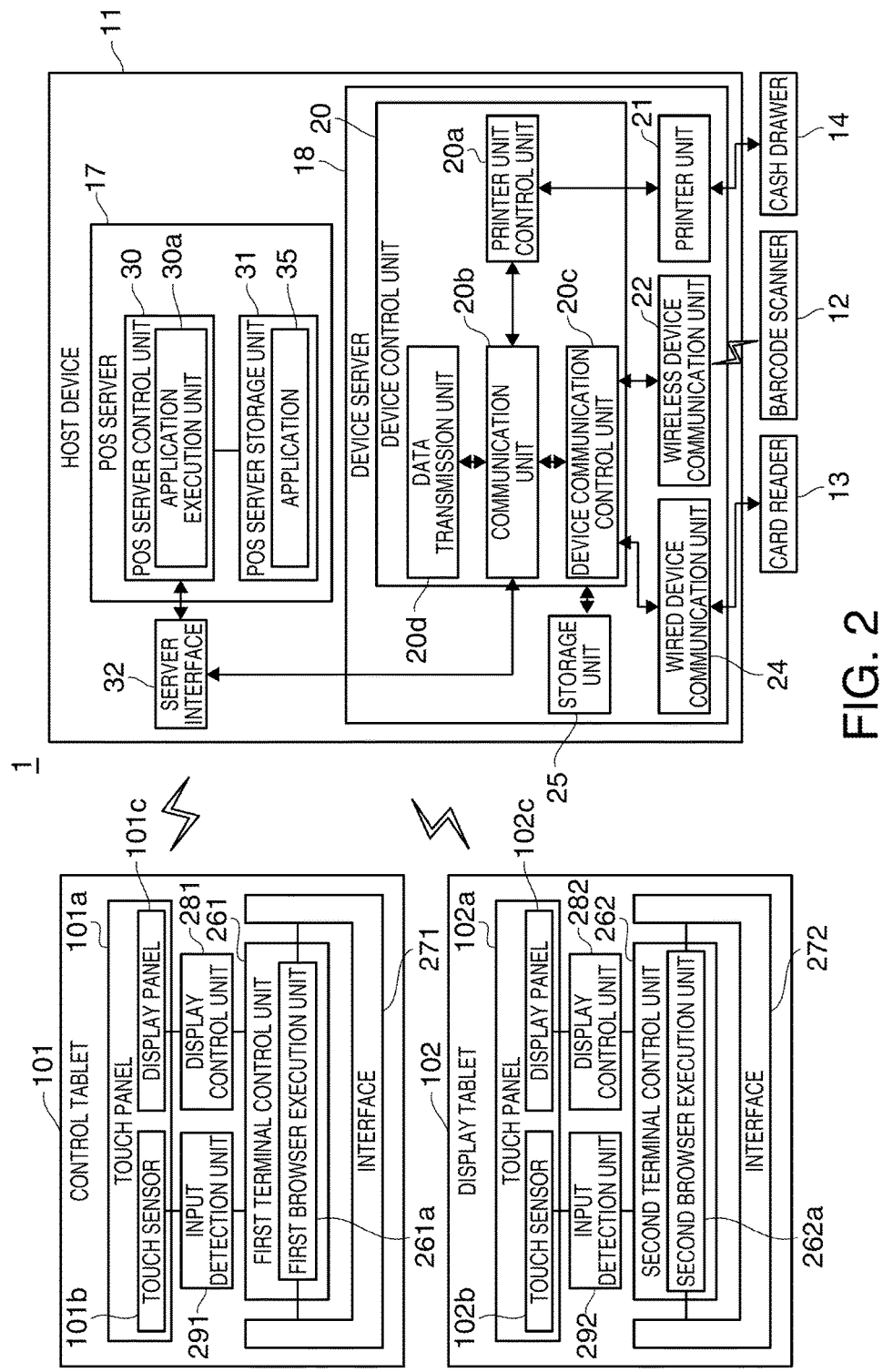
FIG. 2 is a block diagram showing the functional configuration of devices in the POS system.

FIG. 1 is a block diagram illustrating the basic configuration of a POS (point-of-sale) system 1 (transmission system) according to this embodiment of the invention. FIG. 2 is a block diagram illustrating the functional configuration of a control tablet 101 (data supply device, first external device), a display tablet 102 (receiving device, second receiving device, second external device), and a host device 11 (transmission device) in the POS system 1 shown in FIG. 1.

The POS system 1 executes a data process to processes product sales data in a store or other facility such as a retail store, restaurant or bar, or a service provider. The data process includes, for example, registering products, calculating invoice amounts, transaction processes accompanying payment, issuing receipts showing the content of the transaction process, and providing information related to transaction processes. The POS system 1 manages product sales, product inventory, and sales information.

In one example, the POS system 1 is disposed in a retail store. The retail store has a plurality of checkout counters where transaction processes are completed. At least one host device 11 and a plurality of display tablets 102 are installed at each checkout counter.

In this embodiment the POS system 1 has a wireless router 3. The wireless router 3 transmits data wirelessly between the host device 11, the display tablet 102, and a control tablet 101. The wireless router 3 also communicates wirelessly with the control tablet 101, the display tablet 102, and the host device 11. Wireless data communication by the wireless router 3 is wireless data communication according to a specific standard, such as a wireless LAN standard. The wireless router 3 relays data communications between the foregoing devices.

The wireless router 3 connects to a communication network N. The communication network N may be a communication network including public communication networks or dedicated lines, for example. The communication network N may be an open network such as the Internet, or a closed network that can only be accessed by specific devices. An external server 2 (fourth device) also connects to the communication network N. The wireless router 3 relays data communications between the external server 2 and devices including the control tablet 101, the display tablet 102, and the host device 11.

The external server 2 supplies data in response to access from an external device. The external server 2 may be a server that broadcasts weather information, or a server that distributes advertising information, for example.

When the display tablet 102 specifies a URL and accesses the external server 2 by HTTP, the external server 2 sends image data and text data corresponding to the specified URL to the display tablet 102. The display tablet 102 can thus acquire weather information or advertising information from the external server 2, for example.

The control tablet 101 and the display tablet 102 are tablet computers. The control tablet 101 and display tablet 102 each have a touch panel with a display area on the front of the tablet. The operator responsible for transactions at the checkout counter can input data and commands by touching the touch panel.

The control tablet 101 is the terminal used by the operator. The display tablet 102 displays transaction information, such as the total transaction amount, for the customer at the checkout counter. More specifically, the display tablet 102 functions as a so-called customer display.

The host device 11 includes a POS server 17 and a device server 18. The POS server 17 operates as a server that manages the POS system 1, and runs processes such as supplying data to the control tablet 101.

A barcode scanner 12 and a card reader 13 connect to the device server 18 as input devices. The barcode scanner 12 reads barcodes from products or product packaging, and outputs the read result to the device server 18. The card reader 13 reads credit cards and preferred customer cards, for example, and outputs the read result to the device server 18. The card reader 13 may be a device that reads magnetic information from magnetic stripe cards, or a device that reads and writes to IC cards. The barcode scanner 12 connects to the device server 18 by a near-field communication standard such as Bluetooth (T), or the barcode scanner 12 may connect through a wired communication interface such as USB. The card reader 13 connects to the device server 18 through a wired communication interface such as USB.

The device server 18 acquires and sends the read result data input from the barcode scanner 12 and card reader 13 to the control tablet 101.

A cash drawer 14 and a printer unit 21 also connect to the device server 18. The printer unit 21 is housed in the host device 11.

The cash drawer 14 connects to the printer unit 21. The cash drawer 14 and printer unit 21 connect to the device server 18 in a daisy chain. As a result, when the device server 18 outputs an open drawer signal, the printer unit 21 relays the signal and the cash drawer 14 opens. The device server 18 controls the printer unit 21 to print receipts.

As shown in FIG. 2, the host device 11 has a server interface 32 that communicates with the control tablet 101 and the display tablet 102. The server interface 32 connects to the POS server 17 and the device server 18.

The server interface 32 has a specific network card or other communication interface. The server interface 32 operates as controlled by the POS server control unit 30 of the POS server 17 and the device control unit 20 (control unit) of the device server 18. The server interface 32 sends and receives data according to a specific wireless communication protocol between the control tablet 101 and the display tablet 102. The POS server 17 and the device server 18 communicate with the control tablet 101 and the display tablet 102 through the server interface 32.

The server interface 32 corresponds to a transmission unit, a sending/receiving unit, and a communication unit, and corresponds to the first connection unit and second connection unit described below.

The device server 18 includes a device control unit 20 (data control unit), a printer unit 21, a wireless device communication unit 22, a wired device communication unit 24, and a storage unit 25.

The device control unit 20 controls the device server 18. The device control unit 20 includes CPU, ROM, RAM, and other peripheral circuits (not shown in the figure).

The device control unit 20 includes a printer unit control unit 20a, a communication unit 20b, a device communication control unit 20c, and a data transmission unit 20d. These function blocks are embodied by the CPU of the device control unit 20 running a program, for example.

The printer unit control unit 20a runs programs related to controlling the printer unit 21, and controls the printer unit 21. The programs run by the device control unit 20 are created using an API (application programming interface) provided by the manufacturer of the host device 11, for example. These programs include, for example, a program for controlling the printer unit 21, a communication control program, and a program related to device control. The printer unit control unit 20a, the communication unit 20b, the device communication control unit 20c, and the data transmission unit 20d are rendered by the device control unit 20 running these programs.

The printer unit 21 includes a conveyance unit for conveying roll paper, a print unit that prints text and images on the roll paper by means of a thermal head, and a cutter that cuts the roll paper. The printer unit 21 operates as controlled by the printer unit control unit 20a, and prints receipt images on the roll paper. After printing, the printer unit 21 cuts the roll paper at a specific position and issues a receipt.

As described above, the cash drawer 14 is daisy chained to the printer unit 21. The printer unit control unit 20a connects to and communicates with the cash drawer 14 according to a specific serial communication protocol. The printer unit control unit 20a controls the cash drawer 14, and causes the cash drawer 14 to open, for example.

The communication unit 20b handles data communication with the control tablet 101 and the display tablet 102.

The communication unit 20b is connected to the first terminal control unit 261 through the server interface 32 and terminal interface 271, and acquires data sent by the first terminal control unit 261. The communication unit 20b also connects to the server interface 32. The communication unit 20b sends data through the server interface 32 and the terminal interface 272 to the second terminal control unit 262. The data transmission unit 20d controls the communication operation of the communication unit 20b. The device communication control unit 20c executes a device control program to communicate with a device and control the device.

The data transmission unit 20d receives data from the control tablet 101, and passes the received data to the display tablet 102. The data transmission unit 20d uses a data storage box 26 (FIG. 3) rendered in the RAM of the device control unit 20 or the storage unit 25.

More specifically, when the communication unit 20b receives data from the control tablet 101, the data transmission unit 20d stores the received data in a data storage box 26 (storage area). The data transmission unit 20d sends the data newly stored in the data storage box 26 through the communication unit 20b to the display tablet 102.

In this operation the data transmission unit 20d selects or specifies the display tablet 102 corresponding to the data storage box 26 in order to select the destination of the transmitted data.

The wireless device communication unit 22 communicates wirelessly with the barcode scanner 12. The wireless device communication unit 22 communicates wirelessly using a near-field communication standard such as Bluetooth (T), for example. More specifically, the wireless device communication unit 22 includes a relation manager, a relation controller, a high frequency circuit, and an antenna. The device communication control unit 20c reads and runs a Bluetooth driver stack to control Bluetooth hardware, for example. As a result, the device communication control unit 20c controls the wireless device communication unit 22 and communicates with the barcode scanner 12 by near-field communication using the Bluetooth standard.

The wired device communication unit 24 has a physical port such as a network interface card and a connector. The wired device communication unit 24 connects to the card reader 13 by wire according to a standard such as USB, and communicates with the card reader 13 according to a specific communication protocol. The device communication control unit 20c controls the wired device communication unit 24, and exchanges data and signals with the card reader 13.

The storage unit 25 includes a nonvolatile storage device such as a magnetic or optical storage medium or a semiconductor storage device. The storage unit 25 stores programs and data readably and writably by the CPU of the device control unit 20.

The POS server 17 includes a POS server storage unit 31 that stores a database (not shown in the figure) storing product-related information, a database (not shown in the figure) for managing sales, and a database (not shown in the figure) for managing inventory. The POS server 17 uses these databases to manage the POS system 1.

The POS server 17 also has a POS server control unit 30 and POS server storage unit 31, and connects to the server interface 32.

The POS server control unit 30 includes a CPU, ROM, RAM, and other peripheral circuits not shown. The POS server control unit 30 controls the POS server 17. The CPU, ROM, RAM, and other peripheral circuits of the POS server control unit 30 may be the same as those of the device control unit 20.

The POS server storage unit 31 includes a nonvolatile storage device such as a magnetic or optical storage medium or a semiconductor storage device. The POS server storage unit 31 stores programs and data readably and writably by the CPU. The POS server storage unit 31 and the storage unit 25 may be the same device.

The POS server storage unit 31 stores an application 35 so that the application 35 can be loaded. The application execution unit 30a reads and runs the application 35. As a result, the application execution unit 30a can execute processes alone, and can execute processes in conjunction with a first browser execution unit 261a. The application execution unit 30a generates data for web pages requested by the control tablet 101 or the display tablet 102. The application execution unit 30a may also read and send the data for the web pages requested by the control tablet 101 or the display tablet 102 from the POS server storage unit 31 to the device that sent the request. The display tablet 102 receives the web page data sent by the application execution unit 30a, and displays information in a window based on the received data. The window displayed by the display tablet 102 is further described below.

The control tablet 101 includes a first terminal control unit 261, a terminal interface 271, a display control unit 281, an input detection unit 291, and a touch panel 101a.

The touch panel 101a includes a display panel 101c and a touch sensor 101b. The display panel 101c is disposed to the front of the control tablet 101. The touch sensor 101b is disposed on the surface of the display panel 101c. The display panel 101c may be an LCD panel, an OLED panel, e-paper, or other type of flat panel display. The display control unit 281 controls the display panel 101c.

The touch sensor 101b is a capacitive or pressure-sensitive sensor, detects touch operations by the user's finger, stylus, or similar device, and inputs a signal indicating the position where the operation was detected to the input detection unit 291.

The display control unit 281 drives the display panel 101c based on display image data input by the first browser execution unit 261a described below, and displays a window containing text or images on the display panel 101c.

The input detection unit 291 detects the touch operation on the touch panel 101a based on the signals output by the touch sensor 101b. When an operation is detected, the input detection unit 291 generates data indicating the operated position, and outputs to the first browser execution unit 261a. The data output by the input detection unit 291 is, for example, coordinate data expressing the position of the detected operation in coordinates corresponding to the display position on the display panel 101c.

The first terminal control unit 261 includes a CPU, ROM, RAM, and other peripheral circuits, and controls the control tablet 101. The first terminal control unit 261 includes a first browser execution unit 261a. The first browser execution unit 261a runs a browser program and renders a browser function that processes a web page. The first browser execution unit 261a receives a web page written in HTML or other markup language, or a scripting language, from the POS server 17. The first browser execution unit 261a generates display image data for the received web page, and outputs to the display control unit 281.

The first browser execution unit 261a also operates in conjunction with the application execution unit 30a to run a web application using scripts embedded on the web page. More specifically, the first browser execution unit 261a runs a web application provided by the application execution unit 30a, and processes data in conjunction with the application execution unit 30a. The control tablet 101 performs the operations of a POS terminal device using functions of the first browser execution unit 261a, or using functions of a web application run by the first browser execution unit 261a and application execution unit 30a.

When the touch sensor 101b detects a touch operation, the first browser execution unit 261a determines the input content of the touch operation. More specifically, the first browser execution unit 261a identifies the icon at the position that was touched based on the coordinate data input by the input detection unit 291 and the display image data output to the display control unit 281. As a result, the input content of the touch operation can be determined.

The first browser execution unit 261a sends data representing the identified input content to the application execution unit 30a. The application execution unit 30a then processes the data input by the first browser execution unit 261a, and sends the result to the first browser execution unit 261a. The first browser execution unit 261a then receives the process result sent by the application execution unit 30a, and generates and outputs display image data to the display control unit 281. The first browser execution unit 261a also runs the web application supplied by the data transmission unit 20d of the device server 18.

The first browser execution unit 261a runs a web application provided by the data transmission unit 20d. As a result of this operation, the first browser execution unit 261a can pass data through the device server 18 to the display tablet 102.

The terminal interface 271 is controlled by the first terminal control unit 261, and communicates with the device server 18 and the POS server 17 according to a specific wireless communication protocol.

Like the control tablet 101, the display tablet 102 includes a second terminal control unit 262, a terminal interface 272, a display control unit 282, an input detection unit 292, and a touch panel 102a. The terminal interface 272 (sending/receiving unit) exchanges data with an external device such as the host device 11 and external server 2.

The touch panel 102a includes a display panel 102c and a touch sensor 102b. The display panel 102c is disposed to the front of the display tablet 102. The touch sensor 102b is disposed to the surface of the display panel 102c.

The display panel 102c may be an LCD panel, an OLED panel, e-paper, or other type of flat panel display. The touch sensor 102b is a capacitive or pressure-sensitive sensor. The touch sensor 102b detects touch operations by the user's finger, stylus, or similar device, and outputs a signal indicating the position where the operation was detected to the input detection unit 292.

The display control unit 282 drives the display panel 102c, and displays text or images on the display panel 102c. The display control unit 282 drives the display panel 102c based on the display image data input by the second browser execution unit 262a.

The input detection unit 292 detects the touch operation on the touch panel 102a based on the signals output by the touch sensor 102b. When an operation is detected, the input detection unit 292 generates data indicating the operated position, and outputs to the second browser execution unit 262a. The data output by the input detection unit 292 is, for example, coordinate data expressing the position of the detected operation in coordinates corresponding to the display position on the display panel 102c.

The second terminal control unit 262 includes a CPU, ROM, RAM, and other peripheral circuits, and controls the display tablet 102. The second terminal control unit 262 includes a second browser execution unit 262a. The second browser execution unit 262a runs a browser program and renders a browser function that processes a web page.

When the touch panel 102a detects a touch operation, the second browser execution unit 262a determines the input content of the touch operation. More specifically, the second browser execution unit 262a identifies the icon at the position that was touched based on the coordinate data input by the input detection unit 292 and the display image data output to the display control unit 282. As a result, the input content of the touch operation can be determined.

The second browser execution unit 262a accesses the device server 18 through a function of the browser based on the detected input content. The second browser execution unit 262a downloads and stores in RAM (not shown in the figure), for example, data for a web page written in a markup language such as HTML, or a scripting language. The second browser execution unit 262a reads the downloaded web page data using a function of the browser, and generates and outputs display image data for the web page to the display control unit 282.

When data is received from the device server 18, the second browser execution unit 262a (process unit) runs the web application supplied by the device control unit 20. The second browser execution unit 262a receives data from the device server 18 and processes the received data by a function of the web application. For example, the second browser execution unit 262a generates display image data for the text data or image data contained in the data received from the device server 18. The display data is text data or image data downloaded from the device server 18, or text data or image data obtained by processing downloaded data.

The second browser execution unit 262a can also acquire data from the external server 2 or other external device based on data received from the device server 18. For example, when the data received from the device server 18 is a URL (network address) for the external server 2, the second browser execution unit 262a may access the external server 2 by HTTP based on the URL. In this event, the external server 2 sends data including text data or image data in response to the HTTP access. The second browser execution unit 262a then receives the data from the external server 2, and generates the display image data.

Figure 3:
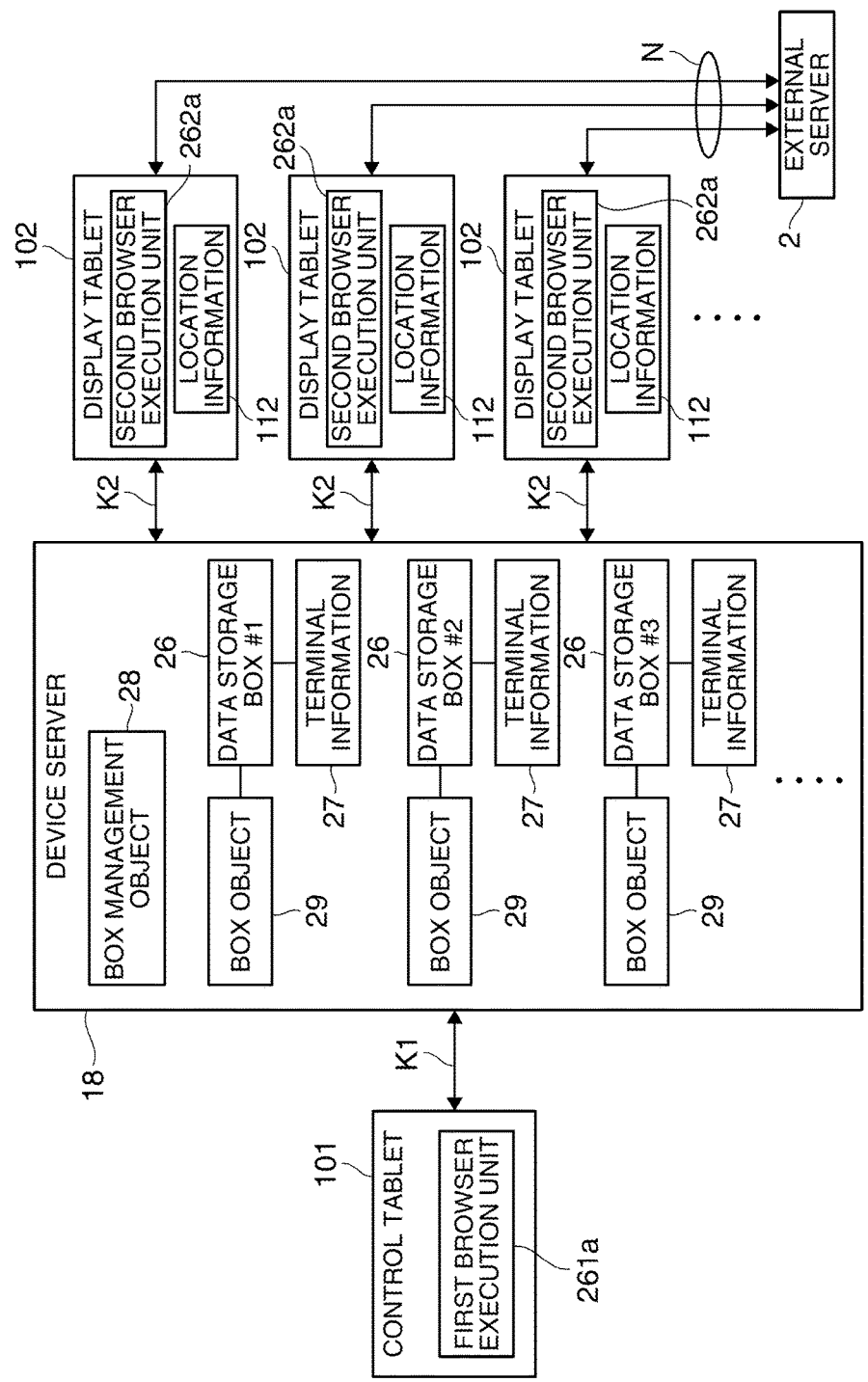
FIG. 3 describes the data transmission operation in the POS system.

FIG. 3 illustrates operation when sending and receiving data between the control tablet 101, the device server 18, and the display tablet 102. FIG. 3 shows the relationship between the communication unit 20b and the data transmission unit 20d of the device control unit 20, the first browser execution unit 261a of the control tablet 101, and the second browser execution unit 262a of the display tablet 102 appropriately to describing their operation.

In FIG. 3 the data storage box 26, box management object 28, and box object 29 are shown as function blocks of the device control unit 20 of the device server 18. A data storage box 26 is a storage area created in RAM of the device control unit 20 or the storage unit 25. The box management object 28 and the box objects 29 use the communication function of the communication unit 20b, and the ability of the data transmission unit 20d to control the communication unit 20b.

The terminal information 27 is data generated by the box management object 28, and is stored with the data storage box 26 in the storage unit 25 or RAM. This embodiment of the invention describes an example in which the data storage box 26 is rendered in the storage unit 25, and the storage unit 25 stores the terminal information 27.

The box management object 28 and box object 29 are objects generated by the device control unit 20. The box management object 28 and box object 29 include a method for processing the terminal information 27 and data stored in a data storage box 26, and a method for communicating with the control tablet 101 and display tablet 102.

When the POS system 1 boots up, or when the host device 11 has started and the first browser execution unit 261a starts operating, the first browser execution unit 261a and the application execution unit 30a run the web application described above. This web application establishes a first path K1, which is a communication path for sending and receiving data, between the first browser execution unit 261a and the device server 18.

The first browser execution unit 261a and the device server 18 open a connection using the WebSocket standard, and establish the first path K1, which is a software interface. The first path K1 is a WebSocket communication path that uses the Socket.io library, for example, but a different standard, such as Comet, may be used.

The web application operates the same way when the POS system 1 starts, or the second browser execution unit 262a starts operating after the host device 11 starts. The web application establishes a second path K2 between the second browser execution unit 262a and the communication unit 20b of the device server 18. Like the first path K1, the second path K2 is a communication path based on a connection opened using the WebSocket standard.

The first path K1 and second path K2 use the server interface 32 as a physical communication path, and a wireless communication connection created by the server interface 32 between the control tablet 101 and the display tablet 102. More specifically, the server interface 32 of the host device 11 establishes the first path K1 and the second path K2 as controlled by the device server 18. The server interface 32 opening the first path K1 corresponds to a first connection unit, and the server interface 32 opening the second path K2 corresponds to a second connection unit.

The second path K2 is opened in the display tablet 102 by a function of the terminal interface 272. As a result, the terminal interface 272 corresponds to a sending unit and a receiving unit, and corresponds to a command transmission unit and second command transmission unit described below.

Multiple display tablets 102 can be connected to the device server 18 in this POS system 1. The device server 18 sends data by push transmission through the second path K2 to the second browser execution unit 262a. The device server 18 can send data to the second browser execution unit 262a when desired, and there is no need for the second browser execution unit 262a to send a request to the device server 18 when data is sent.

A data storage box 26 is a storage area created in the storage unit 25. The number of data storage boxes 26 that can be created, and the amount of data that can be stored in a data storage box 26, are predetermined. A data storage box 26 also has identification information. One data storage box 26 can be identified using this identification information. The control tablet 101 or the host device 11 specifies the identification information of a data storage box 26 when creating the data storage box 26. The values #1, #2 and #3 are assigned as the identification information to the three data storage boxes 26 in the example shown in FIG. 3.

A data storage box 26 is related to a particular control tablet 101 and display tablet 102. Any number of control tablets 101 and display tablets 102 may be related to one data storage box 26. One control tablet 101 may also be related to a plurality of data storage boxes 26, and one display tablet 102 may also be related to a plurality of data storage boxes 26.

The terminal information 27 is information relating a data storage box 26 to a control tablet 101 and a display tablet 102. The terminal information 27 includes the ID assigned to the first path K1 and second path K2, terminal name, or network address (such as an IP address or MAC address) of the terminal, for example, as information identifying the control tablet 101 and the display tablet 102.

Identification information is previously stored in the control tablet 101 and the display tablet 102, and this identification information can be used to identify the control tablet 101 and display tablet 102. This information identifying the control tablet 101 and display tablet 102 is called unique information.

The box management object 28 manages the data storage boxes 26, terminal information 27, and box objects 29. The box management object 28 runs processes related to creating and deleting data storage boxes 26, terminal information 27, and box objects 29. The box management object 28 also creates a data storage box 26 in response to a request from the first browser execution unit 261a or the second browser execution unit 262a, and creates terminal information 27 and a box object 29 for the data storage box 26 that was created. A box object 29 is therefore created for each data storage box 26 as shown in FIG. 3.

The control tablet 101 can send data to a data storage box 26 related to the control tablet 101.

The control tablet 101 sends the data to send to the display tablet 102, and data representing the identification information of the data storage box 26, to the host device 11. Using the identification information contained in the received data, the box management object 28 calls the box object 29 corresponding to the data storage box 26 specified by the identification information. The called box object 29 receives and stores the data in the data storage box 26. The box object 29 references the terminal information 27 corresponding to the data storage box 26 that stored the data. The box object 29 then sends the data stored in the data storage box 26 to the display tablet 102 related to the data storage box 26 by the terminal information 27. As a result, data can be transmitted to the display tablet 102 identified by the terminal information 27 without the control tablet 101 specifying the display tablet 102 to address.

The control tablet 101 can also specify and send data to the display tablet 102. In this event, the box object 29 stores the data received from the control tablet 101 in the data storage box 26, and selects the display tablet 102 specified by the received data as the addressee. Of the display tablets 102 related to the data storage box 26 by the terminal information 27, the box object 29 sends the data to the display tablet 102 selected as the addressee. The control tablet 101 could identify the display tablet 102 by adding data denoting the unique information for the display tablet 102 to the data the control tablet 101 sends to the data storage box 26.

When the display tablet 102 specified by the control tablet 101 is not related to the data storage box 26 specified by the control tablet 101, the box object 29 does not send the data to the specified display tablet 102. In addition, when the control tablet 101 is not related to the data storage box 26 specified by the control tablet 101, the box object 29 does not store the data received from the control tablet 101 in the data storage box 26.

When sending data stored in the data storage box 26 to the display tablet 102, the box object 29 adds data representing the identification information of the data storage box 26. The second browser execution unit 262a can identify the data storage box 26 that stored the data when it receives data.

When the second browser execution unit 262a receives data through the second path K2, it generates display image data to display the received data and outputs to the display control unit 282. As a result, the data transmitted by the control tablet 101 is displayed on the display panel 102c.

The window presented on the display panel 102c by the display control unit 282 has multiple display areas, and the data displayed in each area is related to a data storage box 26 of the host device 11. The correlation between display areas and data storage boxes 26 is specified by the location information 112. When data is received from the host device 11, the second browser execution unit 262a identifies the data storage box 26 that stored the received data from the identification information of the data storage box 26. The second browser execution unit 262a references the location information 112, and identifies the display area corresponding to the data storage box 26 where the received data was stored.

The location information 112 may also include information indicating the display format, such as the displayed size, display color, and background color of text or images, corresponding to the data storage box 26. In this event, the second browser execution unit 262a determines the display format according to the location information 112. The second browser execution unit 262a generates display image data for displaying the data in the display area determined by the location information 112, and outputs to the display control unit 282.

The display control unit 282 displays a window on the display panel 102c based on the display image data input from the second browser execution unit 262a. As a result, the data sent by the control tablet 101 to the data storage box 26 of the host device 11 is displayed on the display panel 102c of the display tablet 102.

A method of transmitting data in the POS system 1 is described next with reference to FIG. 4 to FIG. 6.

FIG. 4 illustrations the operation of the POS system 1 when sending and receiving data. FIGS. 4 (A) and (B) describe the data sent and received through a data storage box. FIG. 4 (A) shows an example of the host device 11 reporting the reception results of the individual display tablets 102 to the control tablet 101. FIG. 4 (B) shows an example of the host device 11 reporting the reception results of multiple display tablets 102 to the control tablet 101 in a single report. FIG. 6 is a sequence diagram showing the operation of devices in the POS system 1.

Figures 6A, 6B, 6C, 6D:
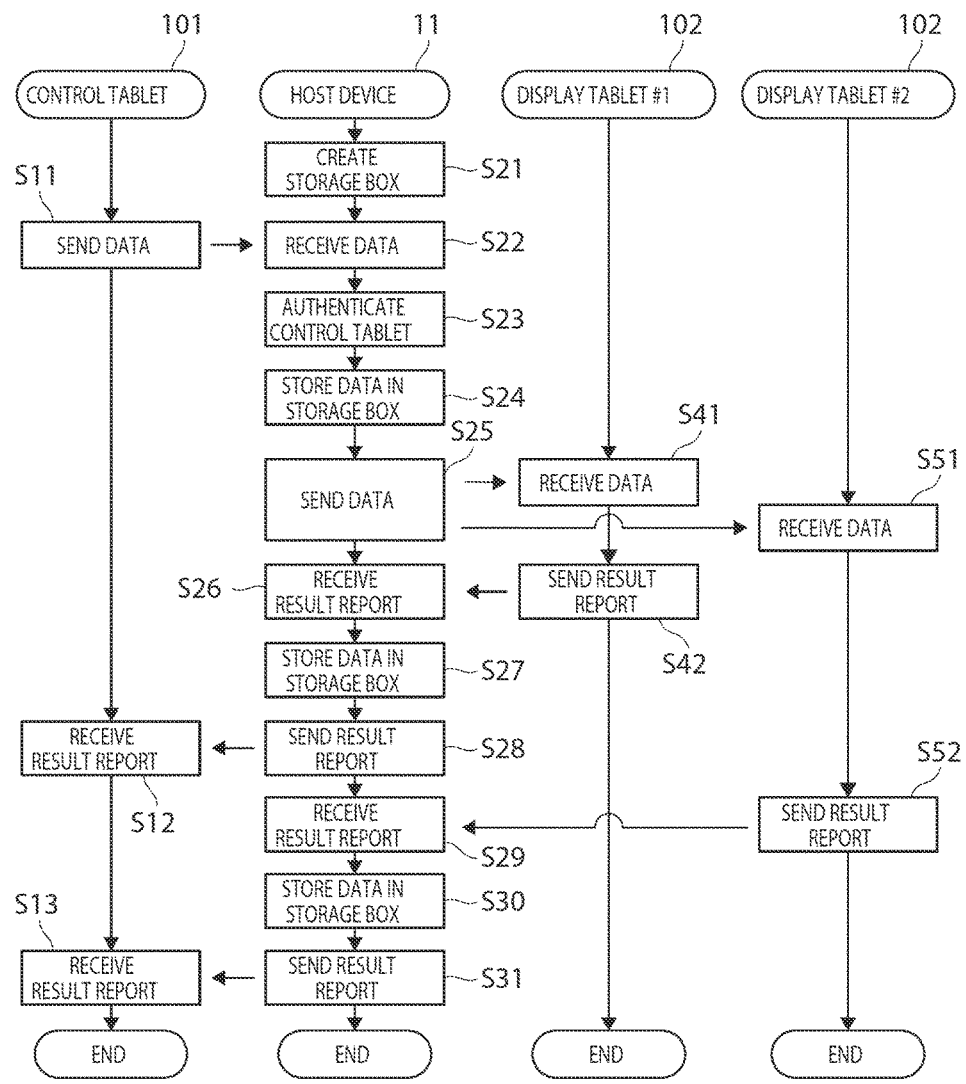
FIGS. 6A-6D show a flow chart illustrating the operation of devices in the POS system.

FIG. 4 and FIG. 6 show an example in which there are one control tablet 101 and two display tablets 102. To differentiate the two display tablets 102, the values #1 and #2 are assigned as the identification information of the display tablets 102. In FIG. 6, (A) shows the operation of the control tablet 101, (B) shows the operation of the host device 11, (C) shows the operation of display tablet #1 102, and (D) shows the operation of display tablet #2 102.

One of display tablets #1 and #2 102 is a receiving device and the second browser execution unit 262a thereof is a process unit. The other of display tablets #1 and #2 102 is a second receiving device and the second browser execution unit 262a thereof is a second process unit.

As shown in FIGS. 4 (A) and (B), the control tablet 101 outputs data to be transmitted to the display tablet 102 (below, transmission data), and data representing the identification information of the data storage box 26. The box object 29 of the data storage box 26 corresponding to identification information specified by the data sent from the control tablet 101 (data storage box #1 26 in this example) is called by the host device 11. The box object 29 stores the transmitted data in the data storage box #1 26.

The box object 29 then sends the transmitted data stored in the data storage box #1 26 to the display tablet #1 102 related to the data storage box #1 26, and to display tablet #2 102. In this example, the box object 29 adds data denoting the identification information of the data storage box 26 that stored the transmitted data (#1) to the transmitted data, and outputs to the display tablet 102. The display tablet #1 102 and the display tablet #2 102 thus receive the transmitted data and the data denoting the identification information (#1) of the data storage box 26 that were sent by the host device 11.

The display tablet #1 102 then generates a report indicating the transmitted data was received. The reception result report (result data) is data indicating if reception succeeded or failed. The display tablet #1 102 sends the reception result report to the host device 11 as data including the identification information (#1) of the display tablet 102. The display tablet #1 102 also sends data denoting the identification information (#1) of the data storage box 26 that is addressed when sending the reception result report.

When the reception result report is received from the display tablet 102, the host device 11 stores the reception result report in the data storage box 26 based on the identification information (#1) sent by the display tablet 102 with the reception result report. The reception result report (result data) including the identification information (#1) of the display tablet 102 is stored in the data storage box 26.

Like display tablet #1 102, display tablet #2 102 also generates reception result report (result data), and sends the reception result report and data including the identification information (#1) of the display tablet 102 to the host device 11. The reception result report received by the display tablet #2 102 includes this identification information (#2) of the display tablet 102. The host device 11 receives and stores the reception result report sent by the display tablet 102 in a data storage box 26. The reception result report (result data) including the identification information (#2) of the display tablet 102 is stored in the data storage box 26.

When the host device 11 thus sends data stored in a data storage box 26 to the display tablets 102 related to the data storage box 26, each of the display tablets 102 sends a reception result report to the host device 11. The reception result reports sent by the display tablets 102 including identification information for the respective display tablet 102.

On the host device 11, the box object 29 related to the data storage box 26 that stored the reception result report then sends to the control tablet 101 a report of the result of transmission to the display tablet 102.

In the example shown in FIG. 4 (A), when the reception result report is stored in the data storage box 26, the box object 29 sends the reception result report (result data) to the control tablet 101. In the example in FIG. 4 (A), this report is sent when the reception result report is received from the display tablet #1 102 and stored in the data storage box 26, and when the reception result report is received from the display tablet #2 102 and stored in the data storage box 26. The reception result report sent by the box object 29 may be the reception result report (result data) stored in the data storage box 26, or the box object 29 may change the data format of the reception result report.

In the example in FIG. 4 (A), the control tablet 101 gets the result of sending data from the data storage box 26 for each of the display tablets 102. The result of reception by each of the display tablets 102 can therefore be managed even if the display tablets 102 related to the data storage box 26 are unknown. As a result, processes such as resending transmitted data to a display tablet 102 that could not normally receive the data can be executed. In this event, the control tablet 101 may specify the display tablet 102 and resend the transmitted data based on the identification information of the display tablet 102 as described above. In this event, the transmitted data is not resent to a display tablet 102 to which the transmitted data could be normally sent. The process of resending transmitted data is therefore efficient.

In the example in FIG. 4 (B), the operation until the reception result report (result data) sent by the display tablet 102 is stored in a data storage box 26 is the same as shown in FIG. 4 (A).

In the example in FIG. 4 (B), the box object 29 of the host device 11 waits until the reception result report is received from the display tablet 102 that sent the transmitted data from the data storage box 26. Because transmitted data is sent to two display tablets 102 in this example, the box object 29 waits until reception result reports are received from the two display tablets 102. Then based on the reception result report (result data) received from the two display tablets 102, the box object 29 generates and sends a single reception result report (process result data) to the control tablet 101. The box object 29 generates a report (process result data) indicating if the display tablet 102 successfully received the transmitted data, or failed. More specifically, if one or more display tablets 102 fail to receive the transmitted data, the box object 29 creates and sends a reception result report indicating that reception failed to the control tablet 101.

In the example in FIG. 4 (B), because the control tablet 101 does not need to manage the reception results for each control tablet 101 and display tablet 102, managing reception results is more efficient. In this example, the control tablet 101 can execute a process such as resending the transmitted data when there is a display tablet 102 that could not receive the data normally.

The operation shown in FIGS. 4 (A) and (B) is the same when the control tablet 101 specifies and sends the transmitted data to a display tablet 102 based on the identification information of the display tablet 102. More specifically, when the control tablet 101 specifies plural display tablets 102, the host device 11 may send reception results including the identification information of each display tablet 102 to the control tablet 101. The host device 11 could also send a single reception result report containing the reception results of the plural display tablets 102. This also applies when the control tablet 101 sends transmitted data to the host device 11 specifying one display tablet 102. The host device 11 may also send identification information for the display tablet 102 included in the reception result report of the display tablet 102, and may send a report not containing identification information.

Figure 5B:
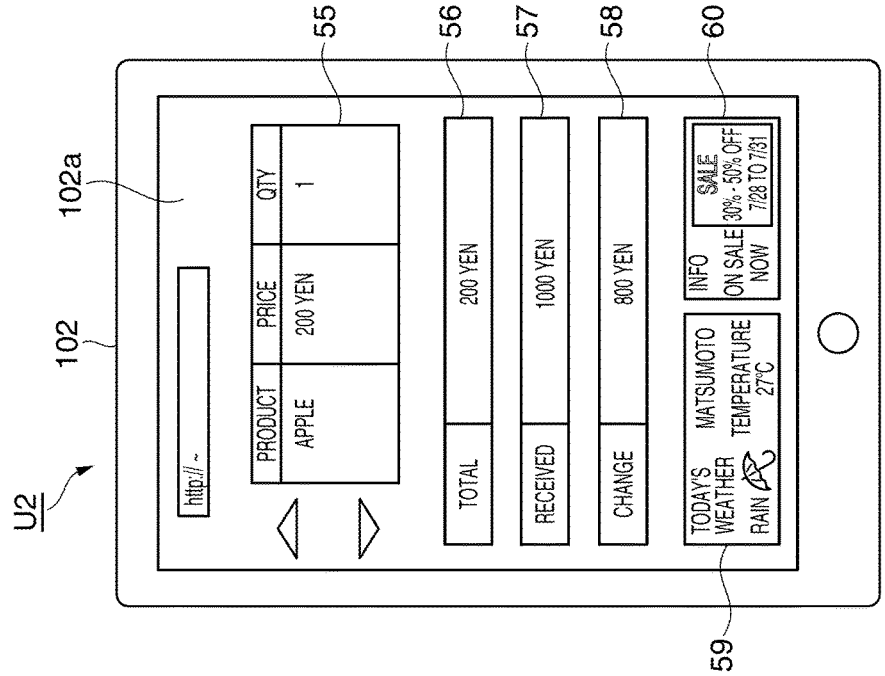
FIGS. 5A and 5B show examples of displays presented on a control tablet and a display tablet.
Figure 5A:
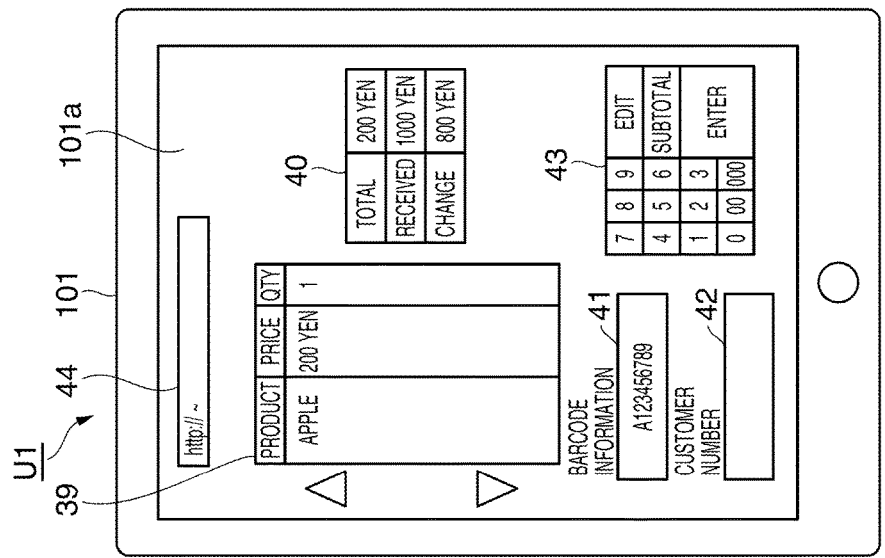

An example of windows presented on the control tablet 101 and the display tablet 102 to illustrate the operation of the POS system 1 described with reference to FIG. 4 (A) is shown in FIG. 5. FIG. 5 (A) shows an example of the display presented on the touch panel 101*a* of the control tablet 101, and FIG. 5 (B) shows an example of the display presented on the display panel 102*c* of the display tablet 102.

The first user interface U1 shown in FIG. 5 (A) is a screen displayed on the touch panel 101*a* when the operator operates the control tablet 101 to perform a transaction process. A display list area 39, amount fields 40, a barcode data field 41, a customer number field 42, and a virtual keypad 43 are included in the first user interface U1.

Product names, prices, and quantities are listed in the display list area 39. The total purchase amount, the amount of money received from the customer, and the amount of change due to the customer are displayed in the amount fields 40. The barcode data field 41 displays the barcode information read by the barcode scanner 12. The customer number field 42 displays a preferred customer number, for example, that was captured by reading a preferred customer card with the card reader 13. The virtual keypad 43 is used to input values to the input fields of the first user interface U1.

The second user interface U2 shown in FIG. 5 (B) is the screen displayed by the display panel 102c when the POS system 1 executes the transaction process. The second user interface U2 has six display areas. Four of these are a product display list area 55, a transaction total display area 56, an amount-received display area 57, and a change-due display area 58.

The product display list area 55 displays the same data displayed in the display list area 39 of the first user interface U1. The transaction total display area 56, amount-received display area 57, and change-due display area 58 display the same data as the amount fields 40.

The control tablet 101 sends the data displayed in these display areas to the data storage box 26, and the box object 29 sends passes the data from the data storage box 26 to the display tablet 102.

The other two display areas in the second user interface U2 are information display area 59 and information display area 60. Information display area 59 displays weather information the second browser execution unit 262a acquired from the external server 2 as described above. The other information display area 60 displays advertising information acquired by the second browser execution unit 262a from the external server 2.

The data displayed in the second user interface U2 is transmitted through the data storage box 26 to the display tablet 102.

For example, the control tablet 101 sends the data displayed in the display list area 39 to data storage box 26 #1. This data is stored in data storage box #1 26, and is sent with data denoting the identification information for the data storage box #1 26 to the display tablet 102.

The control tablet 101 sends the data displayed in the amount fields 40 to the data storage box #2 26. This data is stored in the data storage box #2 26, and is sent with data denoting the identification information for the data storage box #2 26 to the display tablet 102.

The control tablet 101 also sends a URL for acquiring the weather information to data storage box #3 26. This URL is stored in data storage box #3 26, and is sent with data denoting the identification information for the data storage box #3 26 to the display tablet 102.

Data displayed in the other display areas is likewise sent through the data storage boxes 26 to the display tablet 102.

The location information 112 includes information about the display format related to the data storage box 26. For example, the location information 112 may include information relating data storage box 26 identification information (#1 to #3) to respective areas (display areas) shown in FIG. 5 (B). Data sent from data storage box #1 26 to data storage box #3 26 to the display tablet 102 is therefore displayed in the second user interface U2 in the display areas corresponding to the data storage boxes 26. The location information 112 may include information about the display format such as the display size and color of data in the display areas.

Operation of the POS system 1 is shown in the flow chart in FIG. 6.

Before data transmission starts, the host device 11 creates a data storage box 26 as controlled by the box management object 28 (step S21). In this example, data storage box #1 26 is created, and the control tablet 101 and two display tablets 102 are related to this data storage box 26.

The control tablet 101 outputs the transmission data and the identification information (#1) data of the data storage box 26 (step S11). The host device 11 receives the data (step S22), and determines if the control tablet 101 is related to the data storage box #1 26 (step S23). This decision is a type of verification process. If the control tablet 101 is related to the data storage box #1 26, the transmitted data is stored in the data storage box 26 of the host device 11 (step S24).

In this example, the host device 11 sets the display tablet 102 related to the data storage box #1 26 as the display tablet 102 to which to send the data (as the addressee), and sends the transmission data (step S25).

The display tablet #1 102 receives the transmission data from the host device 11 (step S41), and creates and sends a report denoting the reception result (step S42).

The host device 11 receives the reception result report sent from the display tablet #1 102 (step S26), and stores the reception result report in the data storage box 26 based on the identification information of the data storage box 26 added to the reception result report (step S27).

The host device 11 then sends the reception result report stored in the data storage box 26 to the control tablet 101 (step S28).

The control tablet 101 receives the reception result report sent from the host device 11 (step S12).

Like the display tablet #1 102, the display tablet #2 102 receives the transmission data from the host device 11 (step S51), and creates and sends a report denoting the reception result (step S52).

The host device 11 receives the reception result report sent from the display tablet #2 102 (step S29), and stores the reception result report in the data storage box 26 based on the identification information of the data storage box 26 added to the reception result report (step S30).

The host device 11 then sends the reception result report stored in the data storage box 26 to the control tablet 101 (step S31).

The control tablet 101 receives the reception result report sent from the host device 11 (step S13).

In the example shown in FIG. 4 (B), step S28 and step S12 in FIG. 6 are not executed. The host device 11 also creates and sends a single reception result report reporting the reception results of the two display tablets 102 in step S31.

Because a report indicating if the display tablet 102 successfully received the transmission data or failed at reception is sent to the control tablet 101 in the POS system 1 according to this embodiment, the control tablet 101 can manage the reception results. Furthermore, by using a data storage box 26 to report the reception result, sending a reception result report from the display tablet 102 to the host device 11, and sending the reception result report from the host device 11 to the control tablet 101, can be done efficiently.

In the process shown in FIG. 4 and FIG. 6, the transmission data may be sent to the control tablet 101. Because the control tablet 101 and the display tablet 102 can both operate as terminals related to the data storage box 26, data can be pushed by the box object 29 to terminals including the control tablet 101. The display tablet 102 may also function as a data supply device and send data to the host device 11. A configuration that sends data to the control tablet 101 that transmitted data in step S25 as one of the tablets related to the specified data storage box 26 is also conceivable.

As described above, the POS system 1 according to this embodiment includes a display tablet 102 that receives transmission data, a host device 11, and a control tablet 101 that sends transmission data to the host device 11.

The host device 11 includes a server interface 32 that sends the transmission data to a display tablet 102, a storage unit 25 having a data storage box 26 that stores transmission data related to the display tablet 102, and a device control unit 20.

The device control unit 20 receives and stores the transmission data from the control tablet 101 in the data storage box 26. The device control unit 20 sends the transmission data stored in the data storage box 26 to the display tablet 102 related to the data storage box 26. The device control unit 20 sends a result report denoting the result of sending the transmission data based on the report sent from the display tablet 102 to the control tablet 101. As a result, sending data from the control tablet 101 to the display tablet 102 can be simplified. The control tablet 101 can also manage the results of transmission to the display tablet 102.

The device control unit 20 sends to the display tablet 102 data denoting the identification information of the data storage box 26 related to the display tablet 102. The display tablet 102 sends a report about the result of receiving the transmission data from the host device 11 to the host device 11 with identification information for the data storage box 26 specified in the data that was received. As a result, the results of data transmissions to the display tablet 102 can be managed relationally to the data storage boxes 26.

The POS system 1 can also be configured with a plurality of display tablets 102, display tablet #1 102 and display tablet #2 102 in this example. In this configuration, the device control unit 20 sends transmission data to display tablets #1 and #2 102 related to the data storage box 26 when the control tablet 101 sends transmission data specifying a data storage box 26. Based on the reception result reports sent from the display tablets #1 and #2 102, the device control unit 20 generates and sends a reception result report to the control tablet 101. As a result, the data sent by the control tablet 101 can be sent to a plurality of display tablets 102, and the control tablet 101 can manage the results of transmission to the plural display tablets 102.

The result report generated by the device control unit 20 may be a single result report generated based on the reception result report sent from the display tablet #1 102 and the reception result report sent from the display tablet #2 102. In this event, managing transmission results can be simplified block diagram the transmission results of the plural display tablets 102 are sent as a single result report to the control tablet 101.

The result report generated by the device control unit 20 is not limited to the above example. For example, a first result report may be generated based on the reception result report sent from the display tablet #1 102, and a second result report may be generated based on the reception result report sent from the display tablet #2 102. More specifically, the device control unit 20 creates a result report for display tablet #1 102 based on the reception result report sent from display tablet #1 102. The device control unit 20 may also create a result report for display tablet #2 102 based on the reception result report sent from display tablet #2 102. By these result reports being sent to the control tablet 101, the control tablet 101 can individually manage the results of transmission to the individual display tablets 102.

When the control tablet 101 sends transmission data specifying a data storage box 26 and display tablet #2 102, the device control unit 20 sends the transmission data to the specified display tablet #2 102. In this event, the device control unit 20 sends the result report of the display tablet #2 102 to the control tablet 101 based on the reception result report sent from the display tablet #2 102. In this case, the device control unit 20 sends the transmission data to the display tablet #2 102 specified by the control tablet 101, and can manage the result of transmission to display tablet #2 102.

The POS system 1 includes a display tablet 102 that receives data, a host device 11, and a control tablet 101.

The display tablet 102 has a terminal interface 272 with a function for receiving data, and a second browser execution unit 262a that processes data received by the terminal interface 272, and transmits process result data by the terminal interface 272.

The host device 11 receives and sends the result data to the control tablet 101. The host device 11 also has a storage unit 25 with data storage boxes 26 that are related to the control tablet 101 and display tablet 102, and store data and result data.

As a result, when the control tablet 101 transmits data, the host device 11 receives and sends the data to the display tablet 102, and the display tablet 102 sends a report based on the received data to the host device 11.

The report sent by the display tablet 102, and the data received from the control tablet 101 and sent to the display tablet 102, is stored in a data storage box 26.

By thus using the data storage boxes 26 of the host device 11, send data from the control tablet 101 to the display tablet 102 can be simplified. Furthermore, because a report is sent to the control tablet 101, the control tablet 101 can manage the result of operations on the display tablet 102.

When the host device 11 receives a report from a display tablet 102 after sending data stored in the data storage box 26 to the display tablet 102, the host device 11 sends the report as the result of processing the data to the control tablet 101. The control tablet 101 specifies a data storage box 26 and sends the data, and when the report is stored in the data storage box 26, the host device 11 sends the report to the control tablet 101. As a result, sending data from the control tablet 101 to the display tablet 102 can be simplified, and the control tablet 101 can manage the results of processing transmitted data.

The POS system 1 has a plurality of display tablets 102, and data stored in a data storage box 26 is sent to the display tablet #1 102 and the display tablet #2 102. The 26 stores the report sent by display tablet #1 102, and the report sent by display tablet #2 102. Data sent by the control tablet 101 can therefore be sent through a data storage box 26 to a plurality of display tablets 102, and the process results of the display tablets 102 can be managed by the control tablet 101.

The host device 11 may generate and send to the control tablet 101 one reception result report based on the report sent by the display tablet #1 102 and the report sent by the display tablet #2 102. In this configuration, the control tablet 101 can manage the process results of the display tablet 102 and a second display tablet 102 by receiving the one report sent by the host device 11.

The host device 11 may also send the report sent by the display tablet #1 102 and the report sent by the display tablet #2 102 to the control tablet 101. In this configuration, the control tablet 101 can individually manage the process results of both display tablets #1 and #2 102.

When the control tablet 101 specifies a data storage box 26 and sends data, the control tablet 101 does not store the data in the data storage box 26 if the control tablet 101 is not related to the data storage box 26 by the terminal information 27. As a result, the operation that causes the display tablet 102 to receive data sent by the control tablet 101 can be limited to the control tablet 101 related to the data storage box 26. Security can therefore be improved in a system that simplifies sending data from the control tablet 101 to a display tablet 102 so that data that is not allowed will not be received by the display tablet 102.

Embodiment 2

Figures 8A, 8B, 8C, 8D:
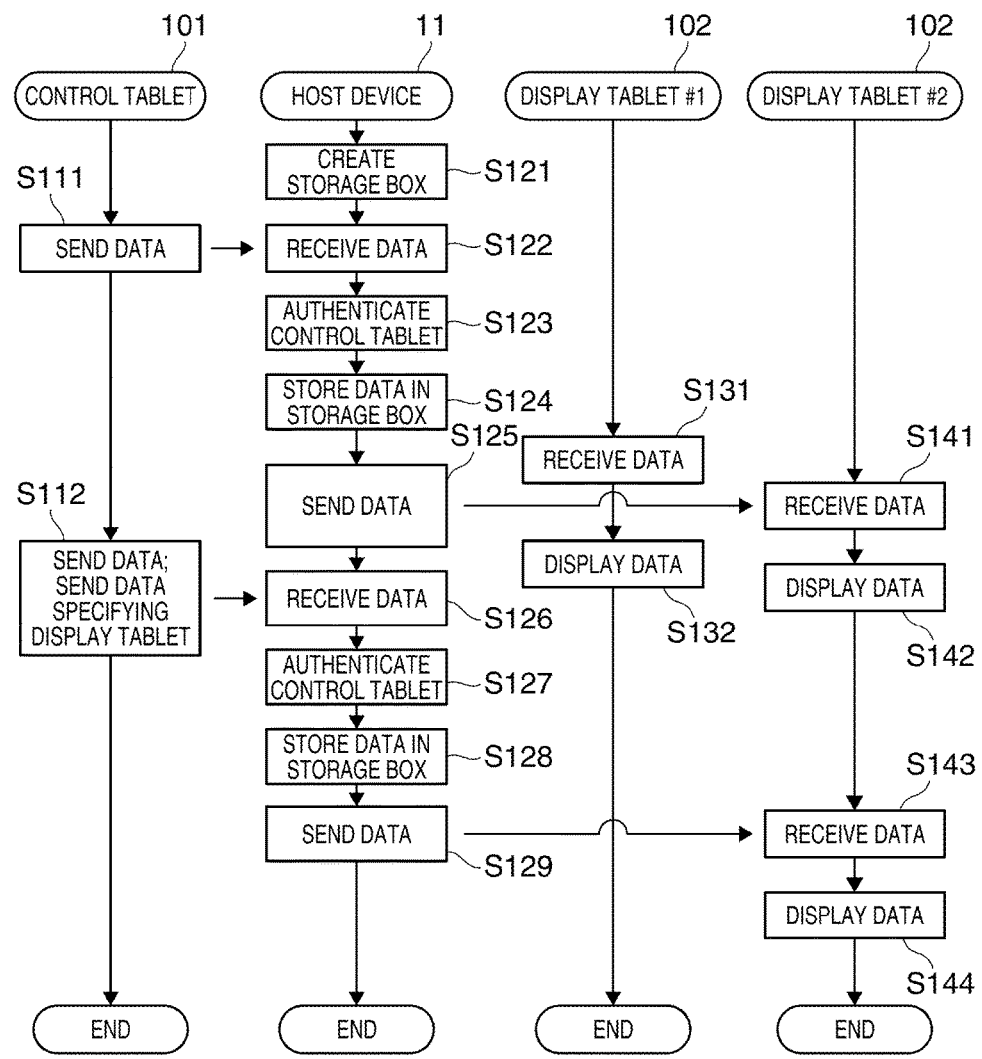
FIGS. 8A-8D show a flow chart illustrating the operation of devices in the POS system according to the second embodiment of the invention.

FIG. 7 and FIG. 8 illustrate a data transmission method in a POS system 1 according to a second embodiment of the invention. Configurations that are the same in the second embodiment and the first embodiment described above are identified by like reference numerals and further description thereof is omitted below.

This second embodiment of the invention is an example of a POS system 1 in which the display tablet 102 does not report the result of receiving transmission data from a data storage box 26 (FIG. 4), and does not send a reception result report from the data storage box 26 to the control tablet 101 (FIG. 4).

FIG. 7 illustrates the data sending and receiving operation in the POS system 1 according to this embodiment. FIG. 7 (A) illustrates when the control tablet 101 does not specify the receiving display tablet 102. FIG. 7 (B) illustrates when the control tablet 101 does not specify the receiving display tablet 102. FIG. 8 is a sequence diagram illustrating the operation of devices in the POS system 1.

The examples shown in FIG. 7 and FIG. 8 illustrate a configuration having one control tablet 101 and two display tablets 102. To differentiate the two display tablets 102, the values #1 and #2 are assigned as the identification information of the display tablets 102. In FIG. 8, (A) shows the operation of the control tablet 101, (B) shows the operation of the host device 11, (C) shows the operation of display tablet #1 102, and (D) shows the operation of display tablet #2 102.

One of display tablets #1 and #2 102 is a receiving device and the other is a second receiving device.

Before data transmission starts, the host device 11 creates a data storage box 26 as controlled by the box management object 28 (step S121). In this example, data storage box #1 26 is created, and the control tablet 101 and two display tablets 102 are related to this data storage box 26.

Operation when the control tablet 101 outputs data (transmission data) and the identification information (#1) data of the data storage box 26 (step S111) is described first as shown in FIG. 7 (A). The host device 11 receives the data (step S122), and determines if the control tablet 101 is related to the data storage box #1 26 (step S123). This decision is a type of verification process. If the control tablet 101 is related to the data storage box #1 26, the transmitted data is stored in the data storage box 26 of the host device 11 (step S124).

In this example, the host device 11 sets the display tablet 102 related to the data storage box #1 26 as the display tablet 102 to which to send the data (as the addressee), and sends the transmission data (step S125). As shown in FIG. 7 (A), the transmission data stored in the data storage box 26 is sent to both control tablet #1 101 and display tablet #2 102. The host device 11 sends the identification information (#1) data of the data storage box 26 where the transmission data was stored with the transmission data to the display tablet 102.

Display tablet #1 102 receives the data sent by the host device 11 (step S131), and displays the received data on the display panel 102c (step S132).

Display tablet #2 102 also receives the data sent by the host device 11 (step S141), and displays the received data on the display panel 102c (step S142). In step S132 and step S142, the display format is determined based on the identification information (#1) data of the data storage box 26 that the host device 11 added to the transmission data.

When the control tablet 101 transmits the transmission data, the identification information (#1) data of the data storage box 26, and the identification information data of the display tablet 102 as shown in FIG. 7 (B) (step S112) is described next.

The host device 11 receives the transmission data, the identification information data of the data storage box 26, and the identification information data of the display tablet 102 (step S126), and verifies the control tablet 101 in the same way as in step S123 (step S127). When the control tablet 101 is related to data storage box #1 26, the transmission data is stored in the data storage box 26 of the host device 11 (step S128). In step S128, the identification information data of the display tablet 102 may also be stored in the data storage box 26.

The host device 11 determines the display tablet 102 related to the identification information data (#2 in this example) of the display tablet 102 received from the control tablet 101 as the addressee to sent the data to, and sends the transmission data (step S129).

In this event, as shown in FIG. 7 (B), the transmission data stored in the data storage box 26 is sent to display tablet #2 102. The transmission data is not sent to display tablet #1 102.

The display tablet #2 102 then receives the data the host device 11 sent (step S143), and displays the received data on the display panel 102c (step S144).

The host device 11 does not send the transmission data stored in the data storage box 26 to a display tablet 102 not related to the data storage box 26. This also applies when the display tablet 102 related to the identification information data of the display tablet 102 sent by the control tablet 101 is not related to the data storage box 26 in the example in FIG. 7 (B).

As described above, in the POS system 1 according to the second embodiment of the invention, the device control unit 20 stores data in the specified data storage box 26 when the control tablet 101 specifies the data storage box 26 when transmitting data. The device control unit 20 sends the data stored in the data storage box 26 to the display tablet 102 related to the data storage box 26. As a result, sending data from the control tablet 101 to a display tablet 102 can be simplified, and the display tablet 102 to which to send the data can be determined with a high degree of freedom.

The POS system 1 according to this embodiment has a plurality of display tablets 102, and plural display tablets 102 may be related to a data storage box 26. If these are a first display tablet 102 and a second display tablet 102, the data storage box 26 may be related to the first display tablet 102 and the second display tablet 102. In this event, the device control unit 20 sends the data stored in the data storage box 26 to the first and second display tablets 102. As a result, when the control tablet 101 specifies a data storage box 26 and transmits data, the transmitted data is sent to the first and second display tablets 102. As a result, sending data from the control tablet 101 to the display tablets 102 can be simplified.

When the control tablet 101 specifies a data storage box 26 and the second display tablet 102 and transmits data, the device control unit 20 sends the data stored in the data storage box 26 to the second display tablet 102. As a result, the correlation between the sending control tablet 101 and the display tablet 102 can be controlled with a high degree of freedom.

A second data storage box 26 that differs from the first data storage box 26 can also be disposed in the storage unit 25 in the POS system 1 according to this embodiment. When data storage box #2 26 is not related to the control tablet 101, the device control unit 20 does not store data in the data storage box #2 26 when the control tablet 101 transmits data specifying the data storage box #2 26. Security can therefore be improved by limiting the control tablets 101 that can transmit data.

Embodiment 3

The data transmission method in a POS system 1 according to a third embodiment of the invention is described below with reference to FIG. 9 to FIG. 15. Configurations that are the same in the third embodiment and the first embodiment described above are identified by like reference numerals and further description thereof is omitted below.

In the third embodiment of the invention, the control tablet 101 and display tablet 102 of the POS system 1 send a command to the host device 11 to run processes including creating a data storage box 26.

Figures 9A, 9B:
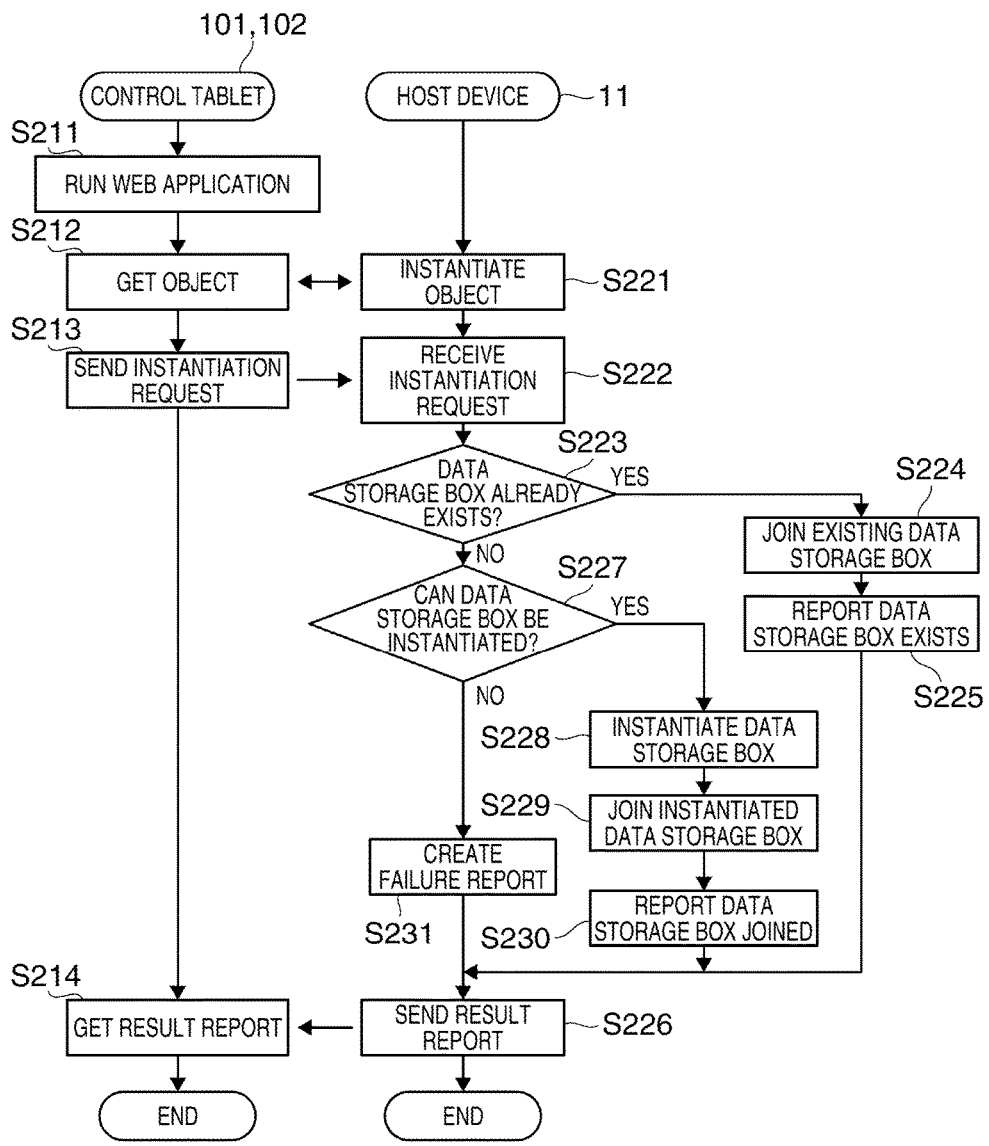
FIGS. 9A and 9B show a flow chart illustrating the operation of devices in the POS system according to a third embodiment of the invention.

FIG. 9 is a flow chart illustrating the operation of devices in the POS system 1 according to the third embodiment of the invention, and illustrates the operation relating the control tablet 101 and display tablet 102 to a data storage box 26. In the operation shown in FIG. 9, the control tablet 101 and the display tablet 102 can perform the same operation. The operation of the control tablet 101 is described below by way of example. Therefore, FIG. 9 (A) shows the operation of the control tablet 101, and (B) shows the operation of the host device 11.

Note that the identification information (memberID) of the control tablet 101 and the display tablet 102 are unique values below. The control tablet 101 and display tablet 102 also store their respective identification information in ROM or other device not shown.

When the first browser execution unit 261a starts operating as a result of an operation on the touch panel 101a, the first browser execution unit 261a accesses the device control unit 20 of the host device 11 and starts the web application (step S211).

Next, the first browser execution unit 261a requests an object, the device control unit 20 creates a box management object 28 (step S221), and the first browser execution unit 261a gets the box management object 28 (step S212).

The first browser execution unit 261a sends a command requesting creation of a data storage box 26 to the host device 11 (step S213).

This command (first command, second command) may take the following form.

openCommBox (x)

where argument x is defined as follows.

option'memberID': reports the identification information (memberID) of the tablet sending the command (in this example, the control tablet 101)

boxID'boxID': specifies the identification information (boxID) of the data storage box 26 callback: requests a response returning the execution result

The box management object 28 receives the openCommBox command (step S222), and creates a data storage box 26. In this process, the box management object 28 determines if a data storage box 26 with the boxID specified by the command already exists (step S223).

If a data storage box 26 with the same boxID already exists (step S223 returns YES), the box management object 28 relates the control tablet 101 to the existing data storage box 26 and updates the terminal information 27 (step S224). The box management object 28 creates a report that the specified data storage box 26 already exists (step S225), and sends the report to the control tablet 101 that transmitted the command (step S226). Note that if the maximum number of tablets that can be related to one data storage box 26 is preset, and the number of tablets related to the specified data storage box 26 has already at the limit, step S224 is skipped. In this event, the box management object 28 returns an error report indicating that the data storage box 26 cannot be joined, for example.

If a data storage box 26 with the same boxID does not already exist (step S223 returns NO), the box management object 28 determines if the data storage box 26 can be created (step S227). For example, if there is a preset limit to the number of data storage boxes 26 that can be created, and this maximum number of data storage boxes 26 has already been created, a new data storage box 26 cannot be created.

If the box management object 28 determines the data storage box 26 can be created (step S227 returns YES), it creates a data storage box 26 with the specified boxID (step S228). In step S228, the box management object 28 creates the data storage box 26, terminal information 27, and a box object 29. The terminal information 27 includes information indicating that the control tablet 101 is related to the data storage box 26. The box management object 28 then creates a report that the data storage box 26 was instantiated (step S230), goes to step S226, and sends the report to the control tablet 101.

If the data storage box 26 cannot be created (step S227 returns NO), the box management object 28 creates an error report indicating that creating the data storage box 26 failed (step S231), goes to step S226, and sends the report.

The first browser execution unit 261a then receives the report from the host device 11 (step S214), and gets the result of the process creating a data storage box 26.

The report sent in step S226 is a report indicating that creating the data storage box 26 succeeded, or an error report that creating the data storage box 26 failed. The error report may be a report indicating the error content, such as that the data storage box 26 already exists, the specified memberID is already related to the data storage box 26, the number of data storage boxes 26 exceeds the limit, or an illegal parameter was detected, for example.

The process of sending a report in step S226 may also be configured to send the report when the callback argument was passed in the openCommBox command, that is, when the first browser execution unit 261a requests a response. Alternatively, after step S224 completes, the first browser execution unit 261a may send the openCommBox (callback) command, and the box object 29 may return the report in response to this command.

When the control tablet 101 or display tablet 102 sends the openCommBox command, a box object 29 is created or the process of relating to the data storage box 26 is executed. In other words, the openCommBox command can be used to instruct instantiating a data storage box 26, as well as instructing establishing a relation to an existing data storage box 26. As a result, by simply sending the openCommBox command with a declared boxID, the control tablet 101 and display tablet 102 can link to a data storage box 26 whether or not the intended data storage box 26 already exists.

Figures 10A, 10B:
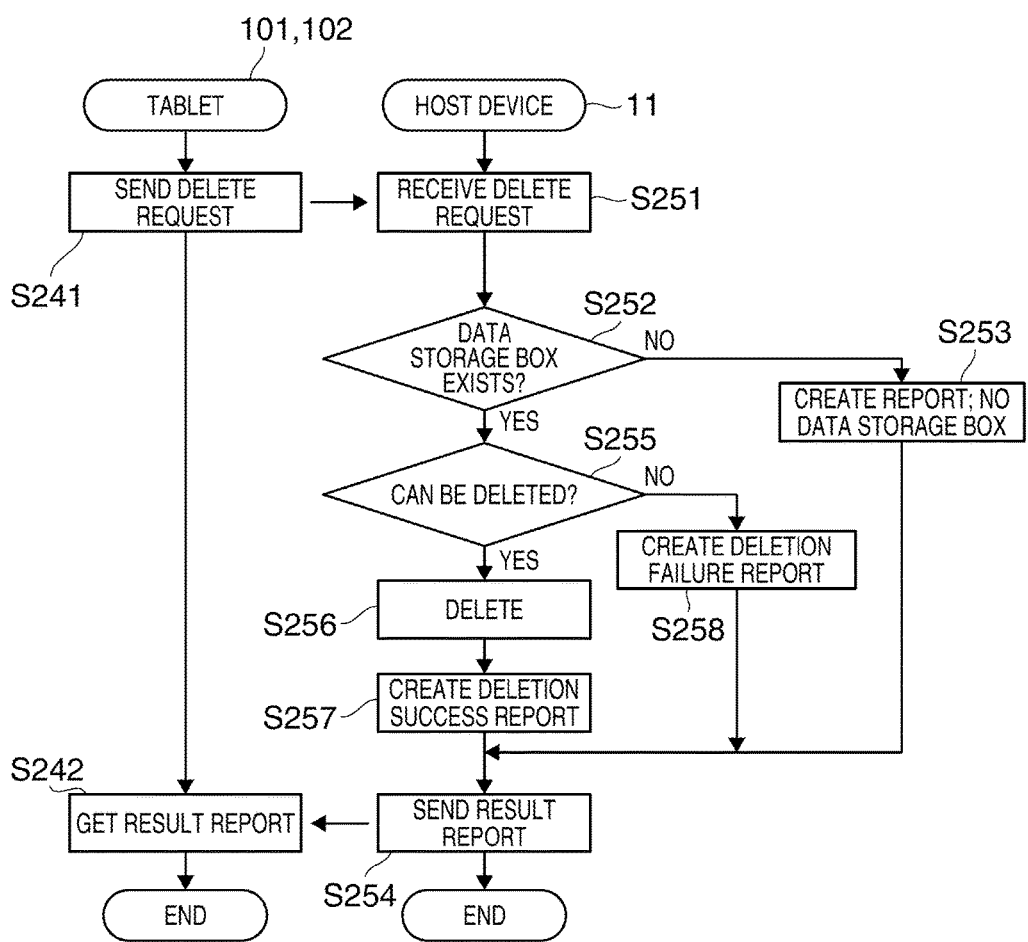
FIGS. 10A and 10B show a flow chart illustrating the operation of devices in the POS system.

FIG. 10 is a flow chart illustrating the operation of devices in the POS system 1, and illustrates operation when the control tablet 101 and display tablet 102 delete a data storage box 26. In the operation shown in FIG. 10, the control tablet 101 and the display tablet 102 may perform the same operation. The operation of the control tablet 101 is described below by way of example below. Therefore, FIG. 10 (A) shows the operation of the control tablet 101, and (B) shows the operation of the host device 11.

The operation described in FIG. 10 is executed with the control tablet 101 related to the data storage box 26. In other words, the operation described in steps S211, S212, and S221 has already executed, and the first browser execution unit 261a can run the web application.

The first browser execution unit 261a sends a command requesting deleting a data storage box 26 to the host device 11 (step S241).

This command may take the following form.
closeCommBox (x)
where argument x is defined as follows.

commBoxObj'boxID': specifies the identification information (the boxID that is the identification information of the data storage box 26 in this example) of the box object 29 to be deleted callback: requests a response returning the execution result Note that the identification information (unique information) of the control tablet 101 sending the closeCommBox command may also be sent as an argument.

The host device 11 receives the closeCommBox command (step S251), and the box management object 28 determines if a data storage box 26 with the specified boxID exists (step S252). If the box management object 28 determines the data storage box 26 does not exist (step S252 returns NO), the box management object 28 creates and sends an error report that the data storage box 26 does not exist (step S253) to the control tablet 101 that sent the command (step S254).

If the data storage box 26 exists (step S252 returns YES), the box management object 28 determines if the data storage box 26 can be deleted (step S255). If the data storage box 26 can be deleted (step S255 returns YES), the box management object 28 deletes the data storage box 26 (step S256). In step S256 the box management object 28 also deletes the terminal information 27 and box object 29 corresponding to the data storage box 26. Next, the box management object 28 creates a report indicating deletion of the data storage box 26 (step S257), and sends the report to the control tablet 101 in step S254.

If the data storage box 26 cannot be deleted (step S255 returns NO), the box management object 28 creates a report indicating deletion of the data storage box 26 failed (step S258), and sends the report to the control tablet 101 in step S254.

The first browser execution unit 261a receives the report from the host device 11 (step S242), and gets the result of the process deleting a data storage box 26.

The report sent in step S254 is a report indicating deleting the data storage box 26 succeeded, or an error report that deletion failed. The error report may be a report that the data storage box 26 does not exist, that deletion failed due to another system error, or other error content.

Like step S226 described above, the process of sending a report in step S254 may be configured to send the report when the callback argument was passed in the closeCommBox command, that is, when the first browser execution unit 261a requests a response. Alternatively, after step S253, S257, or S258, the first browser execution unit 261a may send the closeCommBox (callback) command, and the report may be sent in response to this command.

Figures 11A, 11B, 11C:
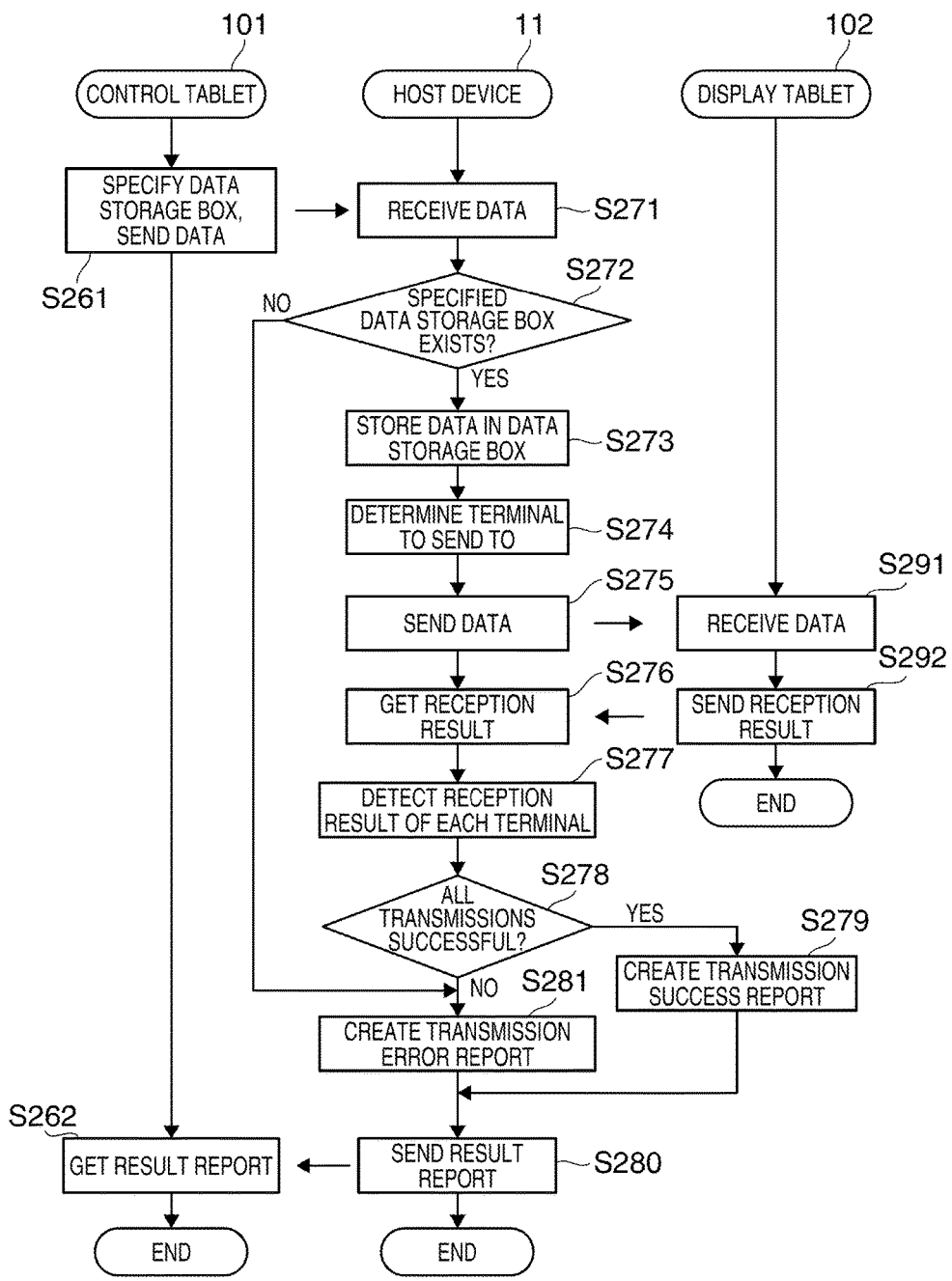
FIGS. 11A-11C show a flow chart illustrating the operation of devices in the POS system.

FIG. 11 is a flow chart illustrating the operation of devices in the POS system 1, and illustrates operation when sending data to a display tablet 102. FIG. 11 (A) shows the operation of the control tablet 101, (B) shows the operation of the host device 11, and (C) shows the operation of the display tablet 102.

As in FIG. 9, the operation described in FIG. 11 is executed with the control tablet 101 that transmits data, and the display tablet 102 that receives the data, related to the data storage box 26.

The first browser execution unit 261a sends data with a command instructing data transmission to the host device 11 (step S261). The command sent by the first browser execution unit 261a may take the following form.
send (x)
where argument x is defined as follows.

cmd: specifies data transmission memberID'memberID': specifies the identification information (memberID) of the display tablet 102 to which to send the data. The specified display tablet 102 then receives the data. If the memberID argument is omitted (nothing is passed between ' ', that is, the value 'null' is passed), the display tablet 102 to receive the data is not specified.

callback: requests a response returning the execution result

For example, if the command send (cmd) (null) is passed, the first browser execution unit 261a can transmit data without declaring the control tablet 101 to which to pass the data.

Note that the identification information (boxID) of a data storage box 26 may also be sent as an argument of the send(x) command. The data storage box 26 specified by the identification information specified by the first browser execution unit 261a in this argument is then the data storage box 26 to which the data is sent.

When the control tablet 101 is related to only one data storage box 26, the first browser execution unit 261a can omit specifying the data storage box 26. In this event, the data storage box 26 related to the control tablet 101 is selected as the data storage box 26 to which to send the data.

The box management object 28 of the host device 11 receives the command and data (step S271), and determines the data storage box 26 to which the data is addressed. More specifically, the box management object 28 determines the data storage box 26 related to the control tablet 101, or the data storage box 26 specified by the control tablet 101. The box management object 28 determines if the data storage box 26 exists (step S272), and if the corresponding data storage box 26 is not found (step S272 returns NO), control goes to step S281.

If the corresponding data storage box 26 is found (step S272 returns YES), the box management object 28 calls the box object 29 corresponding to the addressed data storage box 26. The called box object 29 stores the data in the data storage box 26 (step S273). The box object 29 then determines the display tablet 102 to which to send the stored data (step S274). In step S274, the box object 29 sets the specified display tablet 102 as the addressee if the display tablet 102 is specified by the command received in step S271. If a display tablet 102 is not specified by the command, the display tablet 102 related to the data storage box 26 is set as the addressee.

The box object 29 then sends the data stored in the data storage box 26 in step S273 to the display tablet 102 identified in step S274 (step S275). In step S275, the box object 29 uses a command reporting receiving the data storage box 26. This command may take the following format.
onreceive (x)
where argument x is defined as follows.
data.senderID
Reports data reception and the identification information (senderID) of the control tablet 101 that sent the data.

data.receiverID

Reports data reception and the identification information (receiverID) of the display tablet 102 to which the data was sent.

The box object 29 sends data and can report the identification information of the control tablet 101 that sent the data by means of the onreceive command. The identification information of the sending data storage box 26 may also be included in the onreceive command. This embodiment describes the identification information of the data storage box 26 being added.

When the box object 29 pushes data in step S275, the second browser execution unit 262a receives the data (step S291), and generates the reception result. The second browser execution unit 262a sends the reception result to the host device 11 (step S292), and the box object 29 acquires the reception result (step S276). In step S292, the second browser execution unit 262a determines if reception was successful or if an error occurred based on whether or not the packet sent from the host device 11 was received or not, for example, and returns the reception result.

The box object 29 the reception results acquired from the display tablet 102 that sent data (step S277), and determines if transmission to all of the display tablets 102 was successful or not (step S278).

In this embodiment of the invention the box object 29 generates two results for the result of data transmission. More specifically, these are whether or not reception by all display tablets 102 was successful, and whether a reception error was returned by any display tablet 102.

If reception by all display tablets 102 was successful (step S278 returns YES), the box object 29 creates a successful transmission report (step S279), and sends this report to the control tablet 101 that originated the command (step S280).

If a reception error was returned by any display tablet 102 (step S278 returns NO), the box object 29 goes to step S281, creates a transmission error report, and sends the report to the control tablet 101 in step S280.

The first browser execution unit 261a receives the report from the host device 11 (step S262), and gets the result of the transmission process.

As in step S226 (FIG. 9), and S254 (FIG. 10), the process of sending a report in step S280 may be configured to send the report when callback is passed as an argument of the send command, that is, when the first browser execution unit 261a requests a response. After step S279 or S281, the first browser execution unit 261a may also send the send (callback) command, and the report may be sent in response to this command.

The report sent in step S280 reports that data transmission succeeded, or that data transmission failed. The failure report may be a report that the data storage box 26 does not exist, that the specified memberID does not exist, that transmission failed due to another system error, or other error content. The number of display tablets 102 that attempted transmission may also be included in the transmission success or failure report.

The process shown in FIG. 11 may also send data to a control tablet 101. Because the control tablet 101 can execute processes as a terminal related to the data storage box 26 in the same way as the display tablet 102, the box object 29 can also push data to terminals including the control tablet 101. The display tablet 102 can also function as a data supply device to send data to the host device 11.

A configuration that in step S275 sends data to the control tablet 101 that transmitted data as one of the tablets related to the specified data storage box 26 is also conceivable.

When the display tablet 102 sends the reception result with the boxID of the data storage box 26 in step S292, the corresponding data storage box 26 may not exist. This may happen when the control tablet 101 has deleted the data storage box 26 in response to the closeCommBox command described above. In this event, the display tablet 102 may send an openCommBox command to create the data storage box 26, and report the result of reception by the generated data storage box 26.

Figure 12:
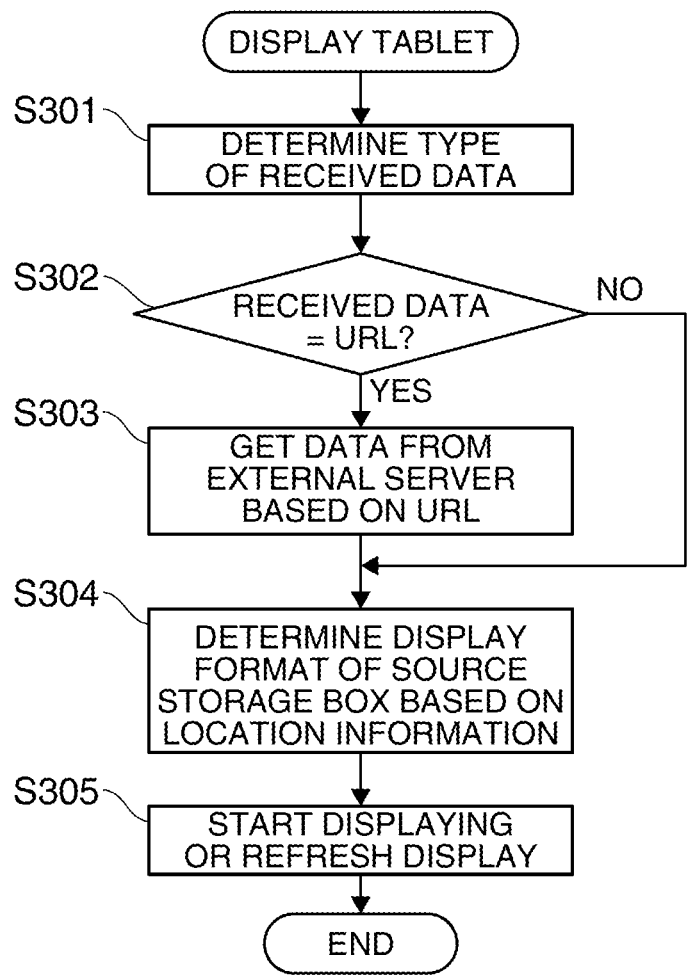
FIG. 12 is a flow chart illustrating the operation of devices in the display tablet.

FIG. 12 is a flow chart is a flow chart illustrating the operation of the display tablet 102, and more specifically illustrates operation when the display tablet 102 receives and displays data.

When data pushed from the host device 11 is received, the second browser execution unit 262a determines the type of received data (step S301). There are two types (attributes) of data, data that is displayed on the touch panel 102a, and acquisition data for getting the data to be displayed on the touch panel 102a. The acquisition data is, for example, a URL for accessing the external server 2.

When the received data is text data, for example, the second browser execution unit 262a determines if the received data is a URL (access information) or data other than a URL (step S302).

If the received data is text data and has a format unique to a URL, such as text data starting with a protocol name such as http, https, or ftp, the second browser execution unit 262a identifies the data as a URL. The second browser execution unit 262a may also determine the type of data based on the identification information of the originating data storage box 26, or the identification information of the originating control tablet 101.

When the received data is determined to be a URL (step S302 returns YES), the second browser execution unit 262a accesses an external device such as the external server 2 based on the URL, acquires data (step S303), and proceeds to step S304. If the received data is determined to not be a URL (step S302 returns NO), the second browser execution unit 262a skips to step S304.

In step S304, the second browser execution unit 262a determines the display format of the received data based on the location information 112. The second browser execution unit 262a determines the display size of the data, the display color, and the background color, for example, according to the location information 112. The second browser execution unit 262a also determines the display area related to the identification information of the originating data storage box 26 according to the location information 112.

The second browser execution unit 262a displays the data received in step S301 or the data acquired in step S303 on the touch panel 102a, or updates the data already being displayed, according to the display format determined in step S304 (step S305).

Figures 13A, 13B:
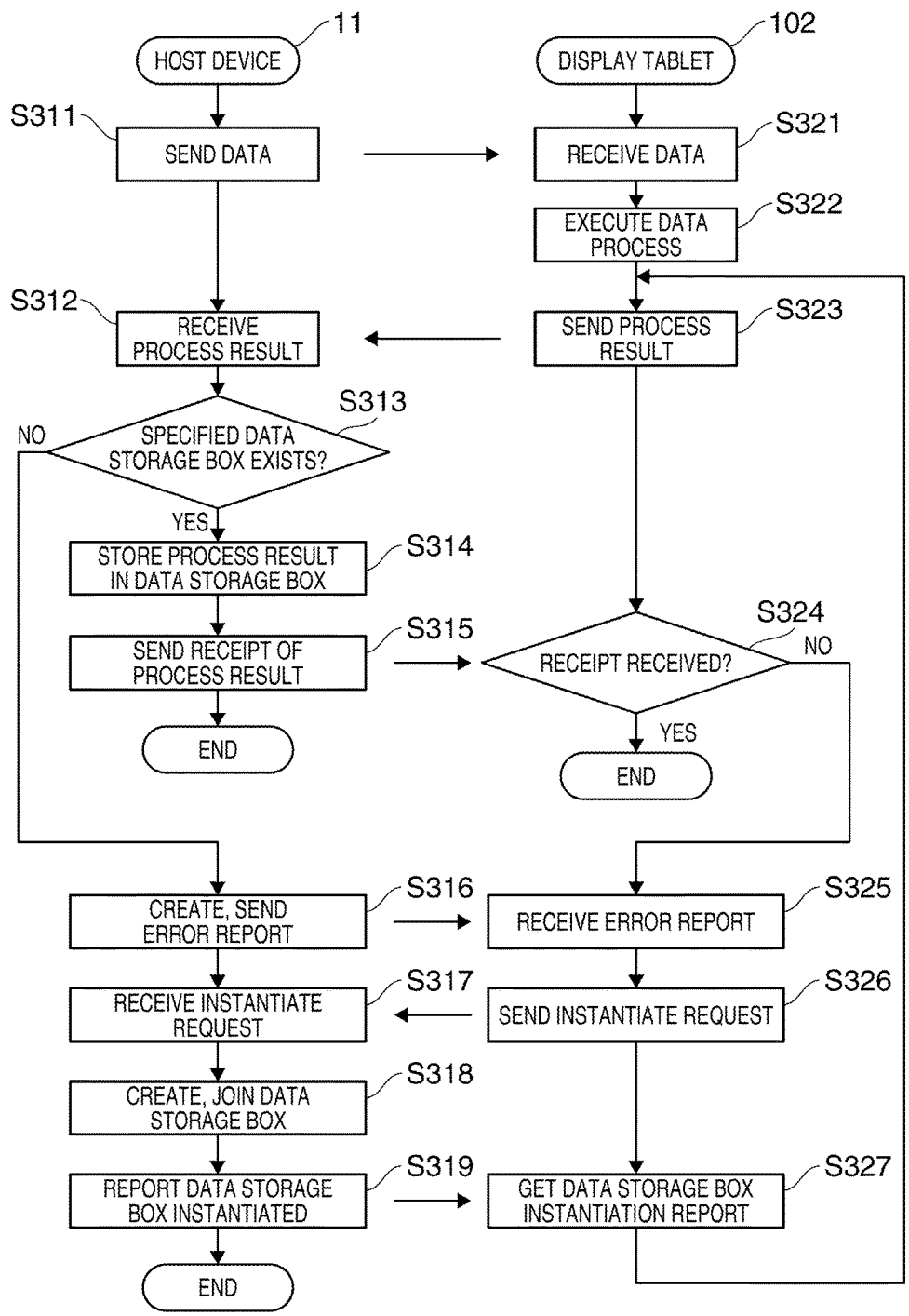
FIGS. 13A and 13B show a flow chart illustrating the operation of devices in the POS system.

FIG. 13 is a flow chart illustrating the operation of devices in the POS system 1, and illustrates operation when the display tablet 102 returns the result of processing the received data. FIG. 13 (A) shows the operation of the host device 11, and (B) shows the operation of the display tablet 102.

The operation described in FIG. 13 is executed with the display tablet 102 related to the data storage box 26 by the operation described in FIG. 9.

The operation of steps S311 and S321 in FIG. 13 correspond to step S275 and S291 in FIG. 11. When the box object 29 sends data from the data storage box 26 to the display tablet 102 (step S311), the second browser execution unit 262a receives the data (step S321). The second browser execution unit 262a then processes the received data, such as by generating the display image data described above (step S322). The second browser execution unit 262a then sends the process result to the data storage box 26 storing the data received in step S321 (step S323).

The box management object 28 receives the process result data sent from the display tablet 102 (step S312), and searches for the specified data storage box 26 (step S313).

If the data storage box 26 is found (step S313 returns YES), the box management object 28 receives the process result by the corresponding box object 29, and the box object 29 stores the process result in the data storage box 26 (step S314). The box object 29 generates a report indicating that the process result was stored in the data storage box 26, and sends the report to the display tablet 102 that sent the process result (step S315). The second browser execution unit 262a receives notification that the process result was received (step S324 returns YES), and ends the process.

If the specified data storage box 26 does not exist (step S313 returns NO), the box management object 28 generates and sends an error report to the display tablet 102 (step S316). If the second browser execution unit 262a determines the report that was sent is an error report (step S324 returns NO), it receives the error report (step S325).

The second browser execution unit 262a then uses the openCommBox command to send a request to create a data storage box 26 to the host device 11 (step S326). This request may include the identification information of the display tablet 102, or the identification information of the data storage box 26, for example. The box management object 28 receives the data storage box 26 create request (step S317), creates the data storage box 26, and generates terminal information 27 (step S318). The identification information of the data storage box 26 specified in the openCommBox command is identification information of a data storage box 26 that was previously created. The box management object 28 may therefore generate terminal information 27 relating the same control tablet 101 and display tablet 102 as the previously instantiated data storage box 26.

After generating the data storage box 26 and box object 29, the box management object 28 returns the result to the display tablet 102 (step S319). When the data storage box 26 creation report is received (step S327), the second browser execution unit 262a returns to step S323 and reports the process result.

The POS system 1 can also resend data the device server 18 sent to a display tablet 102 in response to a request from the display tablet 102.

Figure 14:
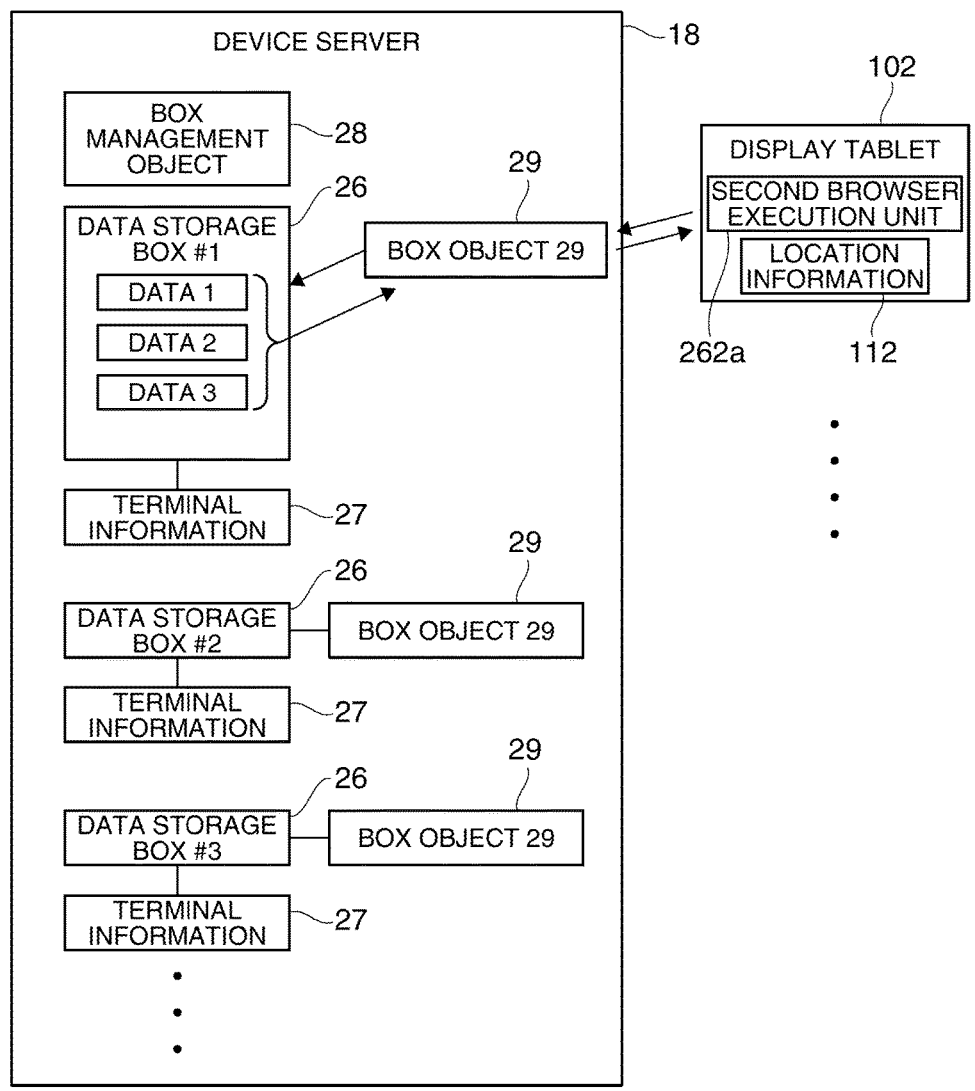
FIG. 14 illustrates a data retransmission operation of the POS system.
Figures 15A, 15B:
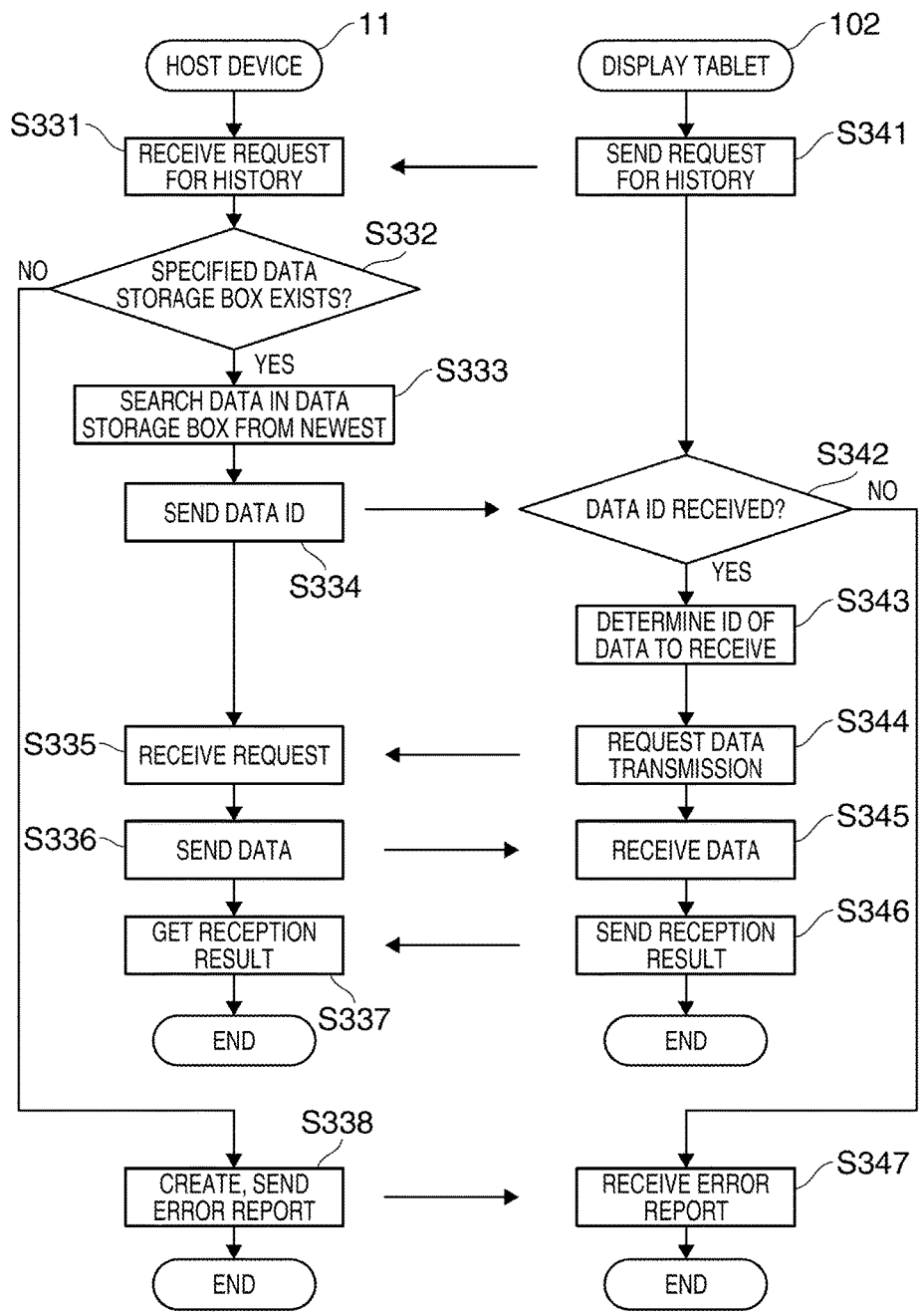
FIGS. 15A and 15B show a flow chart illustrating the data retransmission operation of the POS system.

FIG. 14 illustrates the data retransmission operation of the POS system 1. FIG. 15 illustrates the operation of the POS system 1 related to resending data. FIG. 15 (A) shows the operation of the host device 11, and FIG. 15 (B) shows the operation of the display tablet 102.

When receiving data sent from the data transmission unit 20d fails, the second browser execution unit 262a request retransmission of the data through the second path K2 (step S341). For example, if a packet error occurs when the box object 29 sends data, or the time during which the second browser execution unit 262a does receive data reaches a preset time, the second browser execution unit 262a requests retransmission. The second browser execution unit 262a can use a command that requests the data transmission history from the data storage box 26. This command can take the following format.

getCommHistory (x)

where argument x is defined as follows.

callback

Requests returning the result of the process that sends the transmission history.

Of the data storage boxes 26 related to the display tablet 102, the second browser execution unit 262a adds the identification information of the requested data storage box 26. If the display tablet 102 is related to only one data storage box 26, specifying the data storage box 26 is not necessary. The box management object 28 that receives the request of the second browser execution unit 262a may also determine the intended data storage box 26 based on the IP address or identification information of the display tablet 102.

The second browser execution unit 262a sends a request by the above command, for example, and the box object 29 corresponding to the requested data storage box 26 executes the process (method) corresponding to the command on the device server 18. More specifically, when data retransmission is requested from the second browser execution unit 262a, the terminal information 27 receives the request (step S331). The box management object 28 then determines if the requested data storage box 26 exists. If the intended data storage box 26 does not exist (step S332), the data cannot be retransmitted, and the box management object 28 generates and sends an error report to the display tablet 102 (step S338). The second browser execution unit 262a then receives the error report (step S347).

The process of sending a report in step S338 can be executed in the same way as step S326 (FIG. 9), S254 (FIG. 10), and S280 (FIG. 11). More specifically, the report may be sent when the second browser execution unit 262a requests a reply setting the callback argument in the getCommHistory command. The second browser execution unit 262a may also send the getCommHistory (callback) command in step S338, and the box management object 28 may send the report in response to the command.

The report sent in step S338 reports that data reception was successful or reception failed. The reception failure report may report the cause of the error, such as that the data storage box 26 does not exist or other system error.

If the intended data storage box 26 exists (step S332 returns YES), the box management object 28 calls the box object 29 corresponding to the intended data storage box 26. The invoked box object 29 then searches the data in the data storage box 26 (step S333).

As shown in FIG. 14, plural data objects can be stored in a data storage box 26. A maximum storage capacity is allocated to each data storage box 26 based on the storage capacity of the storage unit 25, for example. In step S273 in FIG. 11, the box object 29 adds data to not exceed the assigned capacity of the data storage box 26. If the capacity of the data storage box 26 is exceeded when data is stored in the data storage box 26, the box object 29 sequentially deletes the data already stored in the data storage box 26 from the oldest data.

In step S333, the box object 29 gets the identification information (data ID) of the data stored in the data storage box 26. This data ID is unique information assigned to the data when the control tablet 101 sends the data, or when the box object 29 stores the data in the data storage box 26. The box object 29 also creates and sends a list of identification information to the display tablet 102 (step S334).

If the second browser execution unit 262a receives a data ID sent from the host device 11 (step S342 returns YES), the second browser execution unit 262a determines the data ID of the data to be received from the received list (step S343). The second browser execution unit 262a then requests transmission based on the specified data ID (step s 344). The second browser execution unit 262a can identify and request data that has not been received from the list of data IDs received from the host device 11, for example. After linking to a data storage box 26, the second browser execution unit 262a can also request all data stored in the data storage box 26 before linking to the data storage box 26.

The box object 29 receives the data request sent by the display tablet 102 (step S335), and reads and sends the requested data from the data storage box 26 (step S336). The second browser execution unit 262a receives the data sent from the host device 11 (step S345), and returns the reception result (step S346). The reception result includes information indicating if reception was successful or if reception failed. The box object 29 thus acquires the reception result sent by the display tablet 102 (step S337), and resends the data as required.

As described above, the POS system 1 according to the third embodiment of the invention has a control tablet 101 and a host device 11.

The control tablet 101 sends a command instructing instantiating a data storage box 26 to store transmitted data.

The host device 11 has a server interface 32 that receives commands sent by the terminal interface 271 of the control tablet 101; a device control unit 20 that instantiates a data storage box 26 to store data sent from the control tablet 101 based on the received command; a storage unit 25 where the data storage box 26 is created; and a communication unit 20b that transmits data stored in the data storage box 26.

In the POS system 1, the host device 11 instantiates a data storage box 26 in response to the command sent by the control tablet 101, and the data stored in the data storage box 26 is sent to another device. As a result, the host device 11 can send data sent by the control tablet 101 to another device. The host device 11 can therefore control the correlation between the control tablet 101 and the device that receives the data sent by the control tablet 101, simplify data transmission, and control the device to which data is transmitted with a high degree of freedom.

The POS system 1 also has a display tablet 102.

The display tablet 102 has a terminal interface 272 that receives data sent by the host device 11; and a second browser execution unit 262a that processes data received by the terminal interface 272.

The data storage box 26 has identification information uniquely identifying the data storage box 26, and the display tablet 102 is related to a data storage box 26 with identification information. As a result, a display tablet 102 can be related to the data storage box 26 instantiated by a command, and the data stored in the data storage box 26 can be sent to the display tablet 102. As a result, the correlation between the control tablet 101 and the display tablet 102 to which the data is sent can be controlled with a high degree of freedom.

The control tablet 101 stores identification information assigned to the control tablet 101, and includes, for example, a memberID as the identification information in the openCommBox command. As a result, a data storage box 26 can be related to a control tablet 101, and the correlation between the control tablet 101 and the display tablet 102 to which data is sent can be precisely controlled.

After the second browser execution unit 262a processes data, the display tablet 102 sends the result of processing the data to a data storage box 26 of the host device 11 by specifying a particular data storage box 26 with the identification information. As a result, the results of processing data by the display tablet 102 can be managed on the host device 11.

Furthermore, when the result of data processing is sent and the data storage box 26 with the identification information is not stored in the storage unit 25 of the host device 11, the display tablet 102 sends the openCommBox command. As a result, a data storage box 26 with the identification information is instantiated in the storage unit 25. As a result, the result of data processing by the display tablet 102 can be stored in the data storage box 26 even when the data storage box 26 has not been instantiated. The process result stored in the data storage box 26 can be sent to the control tablet 101, and can also be sent to other display tablets 102.

After a data storage box 26 is instantiated by a command, the control tablet 101 specifies a data storage box 26 and transmits data using the identification information of the data storage box 26. As a result, the correlation between the control tablet 101 and the display tablet 102 to which data is sent can be precisely controlled.

The first to third embodiments described above are preferred embodiments of the present invention, and can be varied and adapted in many ways without departing from the scope of the invention.

For example, the foregoing embodiments describe configurations in which the device control unit 20 pushes data stored in the data storage box 26 to the display tablet 102, but the invention is not so limited. For example, the receiving device to which the data stored in the data storage box 26 is sent may be the printer unit 21, or an external printer. More specifically, the device control unit 20 may push data to the printer unit 21 or another printer. The device control unit 20 in this configuration may push data by the box object 29. In this configuration, the printer unit 21 or other printer that receives the data may distribute and print the data based on previously set information.

Embodiment 4

Figure 16:
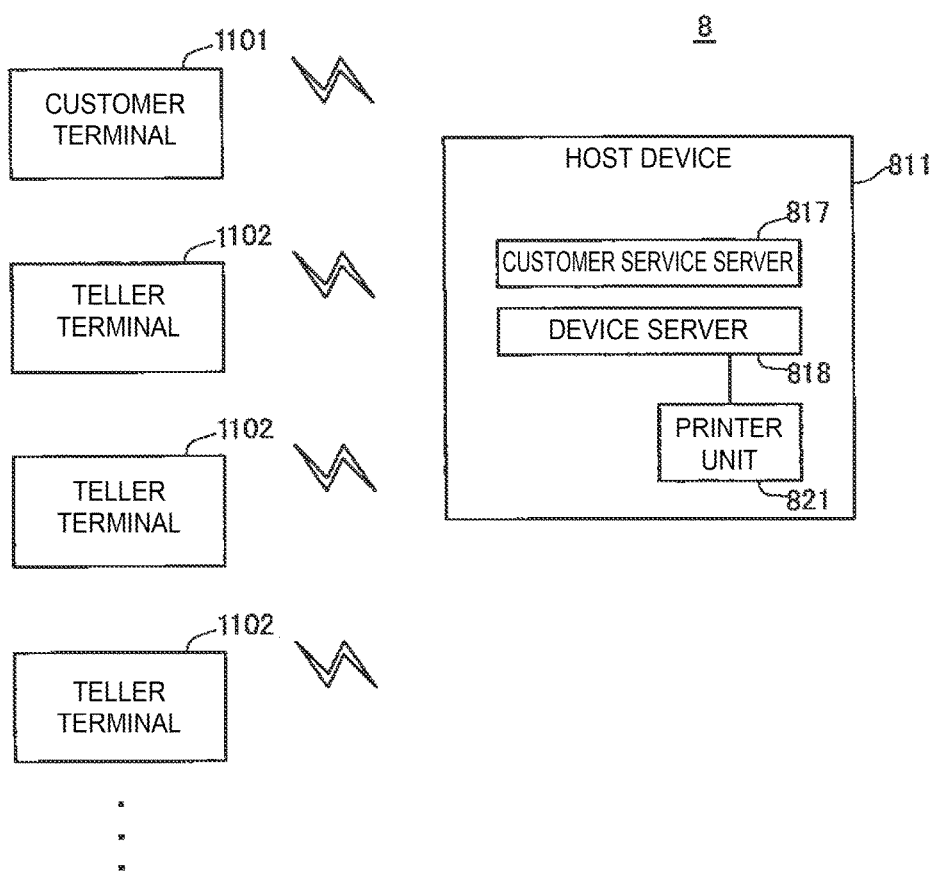
FIG. 16 is a block diagram of a receiving system according to a fourth embodiment of the invention.
Figure 17:
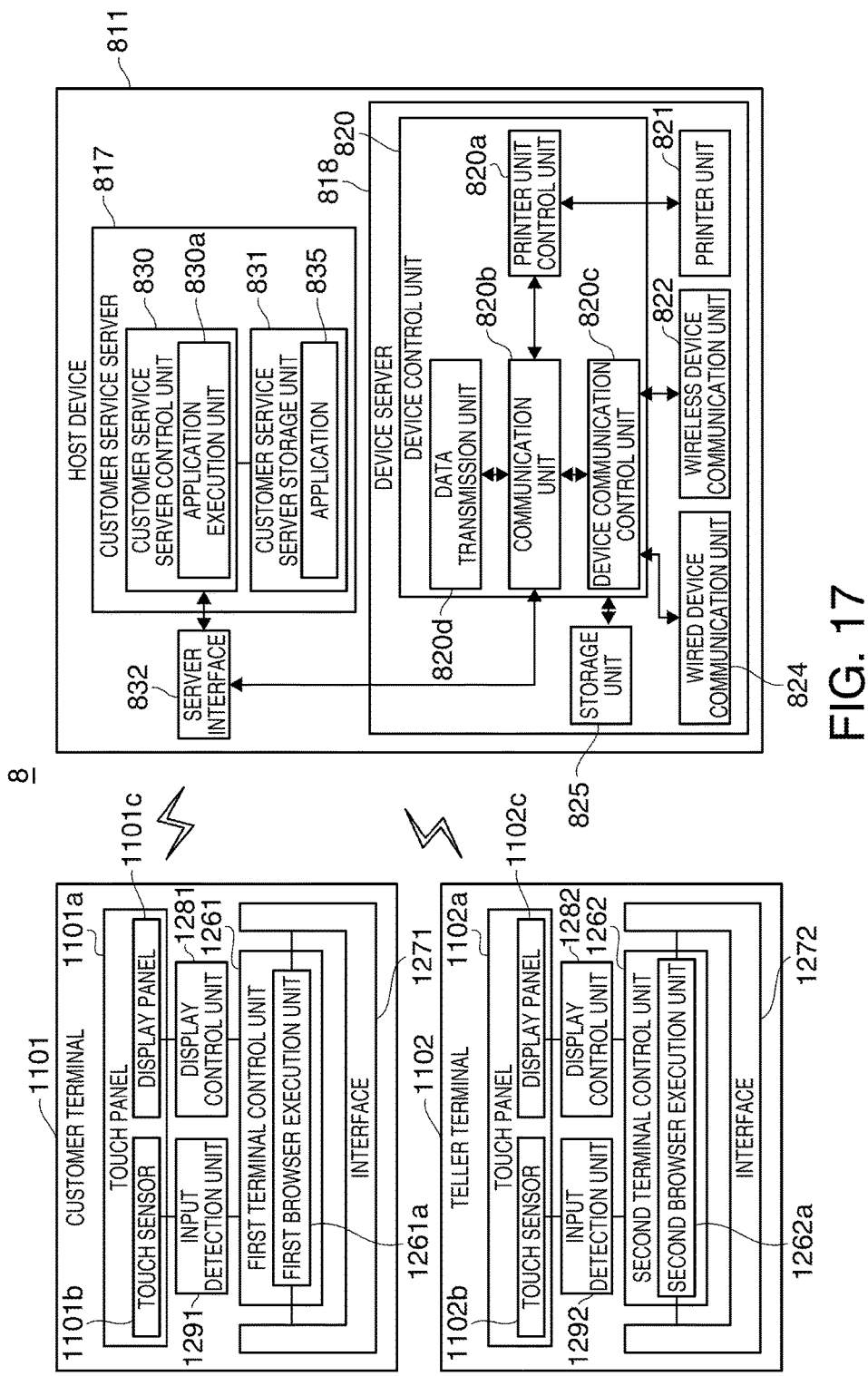
FIG. 17 is a block diagram showing the functional configuration of devices in the receiving system.

FIG. 16 is a block diagram showing the configuration of a receiving system 8 (transmission system) according to a fourth embodiment of the invention. FIG. 17 is a block diagram showing the functional configuration of the customer terminal 1101 (data supply device, first external device), a teller terminal 1102 (receiving device, second receiving device, second external device), and a host device 811 (transmission device) in the receiving system 8 shown in FIG. 17.

The receiving system 8 is a system for sequentially receiving customer requests at a teller window in a financial institution, a retail store, or a service business. The receiving system 8 has an customer terminal 1101 installed at the point of service where requests are received, a teller terminal 1102 installed at a teller window, for example, where customer requests are processed, and a host device 811 that is wirelessly connected to communicate with the customer terminal 1101 and the teller terminal 1102. While there is no specific limit to the number of customer terminals 1101 and teller terminals 1102, this embodiment of the invention describes a configuration having one customer terminal 1101 and multiple teller terminals 1102.

The customer terminal 1101 and teller terminals 1102 are devices to allow input and can display information, and in this embodiment of the invention are tablet computers. The customer terminal 1101 and teller terminals 1102 have a touch panel disposed to the display area formed on the front of the tablet, and enable input by touch.

The customer terminal 1101 is disposed at a location enabling operation by a customer, and accepts customer input in order. When a customer operates the customer terminal 1101, the printer unit 821 of the host device 811 prints a ticket with a queue number, and the queue number is reported to the teller terminal 1102.

The teller terminal 1102 is a terminal that is used by the business operator at the service window where customers are served. The teller terminal 1102 receives the queue number reported from the customer terminal 1101 through the host device 811, and displays the queue number. The operator viewing the display then calls the customer based on the queue number, and serves the customer. The teller terminal 1102 may be installed so that the queue number displayed by the teller terminal 1102 can be seen by the customer. In response to notification of the queue number, the teller terminal 1102 sends a response command to the host device 811. By receiving the response command, the host device 811 knows that a queue number was processed by the teller terminal 1102. Customers received at the customer terminal 1101 can therefore be served in order at the service window.

The host device 811 includes a customer service server 817 and a device server 818. The customer service server 817 operates as a server that manages the receiving system 8, and runs processes such as supplying data to the customer terminal 1101. The customer service server 817 controls I/O devices. A printer unit 821 is connected to the device server 818 in the receiving system 8. The printer unit 821 prints and outputs transmits including the queue number issued by the customer terminal 1101 as controlled by the device server 818. A card reader that reads magnetic stripe cards and IC cards, for example, can connect to the device server 818.

As shown in FIG. 17, the host device 811 has a server interface 832 that communicates with the customer terminal 1101 and the teller terminal 1102. The server interface 832 is a communication interface such as a network interface card. The server interface 832 communicates with the customer terminal 1101 and the teller terminal 1102 according to a specific communication protocol as controlled by the customer service server control unit 830 of the customer service server 817 and the device control unit 820 of the device server 818. The host device 811 also connects and communicates with the customer terminal 1101 and the teller terminal 1102 through the server interface 832. The server interface 832 corresponds to a transmission unit, a sending and receiving unit, and a communication unit, and can be used as the first connection unit and second connection unit described above.

The device server 818 includes a device control unit 820 (data control unit), a printer unit 821, a wireless device communication unit 822, a wired device communication unit 824, and a storage unit 825.

The device control unit 820 controls the device server 818. The device control unit 820 includes CPU, ROM, RAM, and other peripheral circuits (not shown in the figure).

The device control unit 820 includes a printer unit control unit 820a, a communication unit 820b, a device communication control unit 820c, and a data transmission unit 820d. These function blocks are embodied by the CPU of the device server 818 running a program, for example. The programs run by the device control unit 820 are created using an API (application programming interface) provided by the manufacturer of the host device 811, for example. These programs include, for example, a program for controlling the printer unit 821, a communication control program, and a device control program. The printer unit control unit 820a controls the printer unit 821 by means of the control program of the printer unit 821. The communication unit 820b likewise runs a communication control program, and the device communication control unit 820c executes a device control program.

The printer unit 821 includes a conveyance unit for conveying roll paper, a print mechanism that prints text and images on the roll paper by means of a thermal head, and a cutter that cuts the roll paper. The printer unit 821 operates as controlled by the printer unit control unit 820a. More specifically, the printer unit 821 prints receipt images on the roll paper, cuts the roll paper at a specific position and issues a ticket.

Devices other than the printer unit 821 can connect to the host device 811. As a result, the host device 811 also has a wired device communication unit 824 that connects to a device through a cable, and a wireless device communication unit 822 that connects to a device wirelessly. The wireless device communication unit 822 enables wireless communication using an near-field communication standard such as Bluetooth (T), or a wireless LAN standard. The wired device communication unit 824 is a wired interface such as USB, IEEE1394, RS232C, or IEEE1284.

The communication unit 820b runs a communication control program to communicate data with the customer terminal 1101 and teller terminal 1102. More specifically, the communication unit 820b communicates data with a first terminal control unit 1261 through the server interface 832 and a terminal interface 1271. The communication unit 820b communicates data with the second terminal control unit 1262 through the server interface 832 and a terminal interface 1272.

The data transmission unit 820d distributes data received from the customer terminal 1101 to a teller terminal 1102 using a data storage box 826 (FIG. 18), which is a storage area created in the storage unit 825 or RAM of the device control unit 820.

The storage unit 825 includes a nonvolatile storage device such as a magnetic or optical storage medium or a semiconductor storage device. The storage unit 825 stores programs and data readably and writably by the CPU of the device control unit 820.

The customer service server 817 also has a customer service server control unit 830 and customer service server storage unit 831, and connects to the server interface 832.

The customer service server control unit 830 includes a CPU, ROM, RAM, and other peripheral circuits not shown, and controls the customer service server 817. The CPU, ROM, RAM, and other peripheral circuits of the customer service server control unit 830 may be the same as those of the device control unit 820.

The customer service server storage unit 831 includes a nonvolatile storage device such as a magnetic or optical storage medium or a semiconductor storage device. The customer service server storage unit 831 stores programs and data readably and writably by the CPU. The also stores data managing the order in which the customer terminal 1101 receives customer requests. The customer service server storage unit 831 and the storage unit 825 may be the same device.

The customer service server storage unit 831 stores an application 35 so that the application 35 can be loaded. By reading and running an application 35, the application execution unit 830a can execute processes independently or with the first browser execution unit 1261a.

The customer terminal 1101 includes a first terminal control unit 1261, a terminal interface 1271, a display control unit 1281, an input detection unit 1291, and a touch panel 1101a.

The touch panel 1101a includes a display panel 1101c disposed to the front of the customer terminal 1101 and a touch sensor 1101b disposed over the display panel 1101c. The display panel 1101c may be an LCD panel, an OLED panel, e-paper, or other type of flat panel display, and is controlled by the display control unit 1281.

The touch sensor 1101b is a capacitive or pressure-sensitive sensor, detects touch operations by the user's finger, stylus, or similar device, and inputs a signal indicating the position where the operation was detected to the input detection unit 1291.

The display control unit 1281 drives the display panel 1101c based on display data input from the first browser execution unit 1261a, and displays a window containing text or images on the display panel 1101c.

The input detection unit 1291 detects the touch operation on the touch panel 1101a based on the signals output by the touch sensor 1101b. When an operation is detected, the input detection unit 1291 generates data indicating the operated position using coordinates corresponding to the display position on the display panel 1101c, and outputs to the first browser execution unit 1261a.

The first terminal control unit 1261 includes a CPU, ROM, RAM, and other peripheral circuits, and controls the customer terminal 1101. The first terminal control unit 1261 includes a first browser execution unit 1261a that renders a browser function by running a browser program. The first browser execution unit 1261a receives a web page written in HTML or other markup language, or a scripting language, from the customer service server 817. The first browser execution unit 1261a generates display image data for the received web page, and outputs to the display control unit 1281.

The first browser execution unit 1261a also operates in conjunction with the application execution unit 830a to run a web application using scripts embedded on the web page. More specifically, the first browser execution unit 1261a runs a web application provided by the application execution unit 830a, and processes data.

The first browser execution unit 1261a determines the input content of the touch operation based on based on the coordinate data input by the input detection unit 1291 corresponding to the position that was touched on the touch sensor 1101b, and the display data output to the display control unit 1281. The first browser execution unit 1261a sends data representing the identified input content to the application execution unit 830a. The application execution unit 830a then processes the input data, and sends the result to the first browser execution unit 1261a. The first browser execution unit 1261a then outputs display data to the display control unit 1281 based on the received process result. The first browser execution unit 1261a also runs the web application supplied by the data transmission unit 820d of the device server 818.

The terminal interface 1271 communicates with the device server 818 and the customer service server 817 according to a specific wireless communication protocol as controlled by the first terminal control unit 1261.

Like the customer terminal 1101, the teller terminal 1102 includes a second terminal control unit 1262, a terminal interface 1272, a display control unit 1282, an input detection unit 1292, and a touch panel 1102a. The terminal interface 1272 is a transmission unit and a reception unit, a command transmission unit, and a second command transmission unit.

The touch panel 1102a is a tablet computer configured identically to the touch panel 1101a, and is placed at the front of the teller terminal 1102. The display control unit 1282 displays a window containing text or images on the display panel 1101c based on display data input from the second browser execution unit 1262a.

The input detection unit 1292 detects the touch operation on the touch panel 1102a based on the signals output by the touch sensor 1102b. The input detection unit 1292 generates coordinate data indicating the operated position in coordinates corresponding to the display position on the display panel 1102c, and outputs to the second browser execution unit 1262a.

The second terminal control unit 1262 includes a CPU, ROM, RAM, and other peripheral circuits, and controls the teller terminal 1102. The second terminal control unit 1262 includes a second browser execution unit 1262a that renders a browser function by running a web program. The second browser execution unit 1262a accesses the device server 818 through a function of the browser according to operation of the touch panel 1102a. The second browser execution unit 1262a receives a web page from the device server 818, and generates and outputs display data to display the web page to the display control unit 1282.

When data sent from the device server 818 is received, the first browser execution unit 1261a (process unit) and the device control unit 820 run the web application provided by the device control unit 820. By a function of the web application, the second browser execution unit 1262a receives data from the device server 818 and generates display data.

In this receiving system 8, instructions telling the customer how to use the system, and icons for buttons operated by the customer, are displayed on the display panel 1101c of the customer terminal 1101. When the customer operates a button by touching it, the input detection unit 1291 detects the operation by means of the touch sensor 1101b. The first browser execution unit 1261a sends data identifying the customer operation to the application execution unit 830a, and in conjunction with the application execution unit 830a generates a queue number. The first browser execution unit 1261a generates and outputs display data for displaying the queue number to the display control unit 1281. The display control unit 1281 then displays the queue number on the display panel 1101c based on the input display data.

The first browser execution unit 1261a also sends the queue number and a request to produce a ticket to the device control unit 820. The communication unit 820b of the device control unit 820 then receives the request to produce a ticket. The communication unit 820b then outputs the received request and data denoting the queue number to the printer unit control unit 820a. The printer unit control unit 820a then prints a ticket using the printer unit 821 according to the input data.

The customer terminal 1101 sends data for the queue number issued to the customer to the device server 818. The communication unit 820b of the device server 818 receives the data. The data transmission unit 820d stores the received data in a data storage box 826 created in the storage unit 825, and broadcasts the queue number from this data storage box 826 to the teller terminals 1102. As a result, the queue number data is sent to multiple teller terminals 1102.

The teller terminals 1102 execute an operation of receiving the queue number data and displaying the queue number. The teller terminals 1102 send a response command to the device server 818 when a particular operation is performed by the operator, or in a process that executes when the queue number is displayed. This response command is a command indicating that the queue number was processed. The terminal interface 1271 that sends the response command is a response command transmission unit.

The communication unit 820b (sending and receiving unit) of the device server 818 receives and outputs the response command to the data transmission unit 820d. The data transmission unit 820d then processes the data in the data storage box 826 according to the response command.

Figure 18:
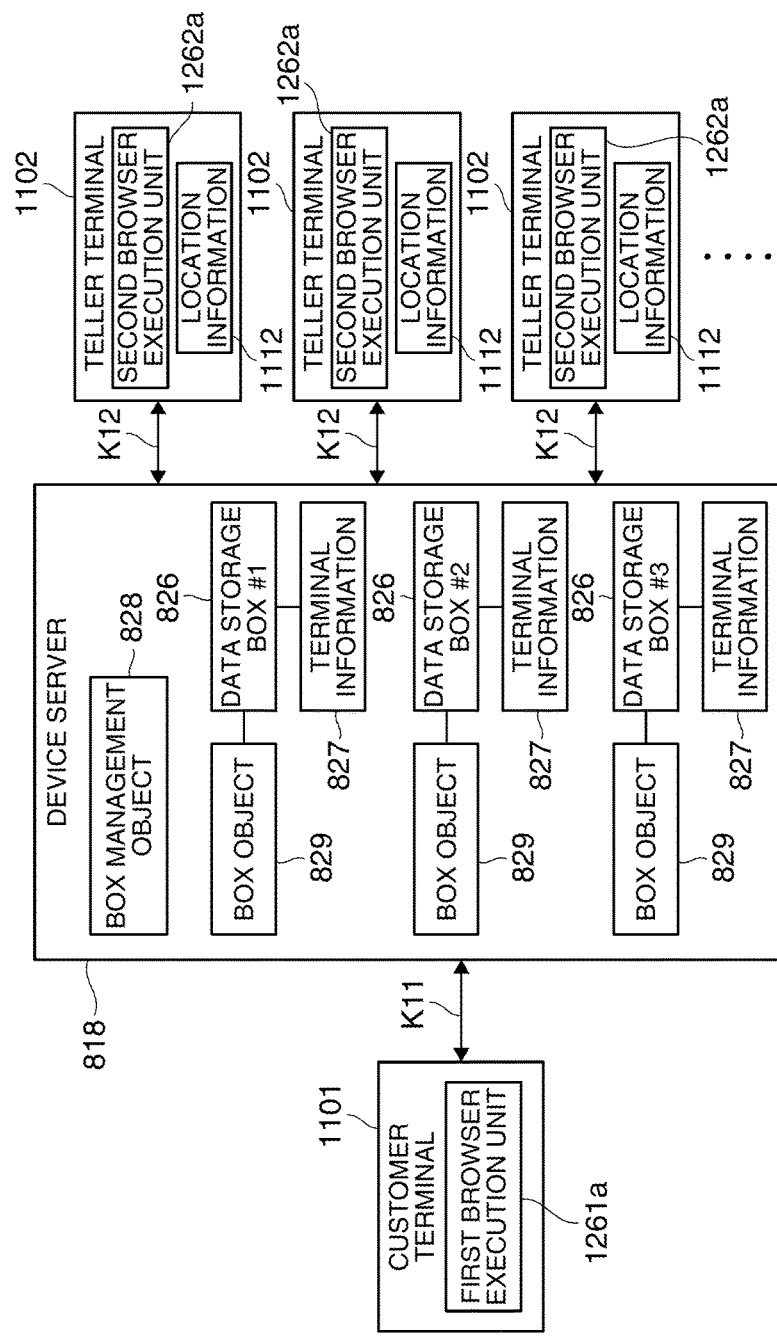
FIG. 18 illustrates the data transmission operation in the receiving system.
Figure 19A:
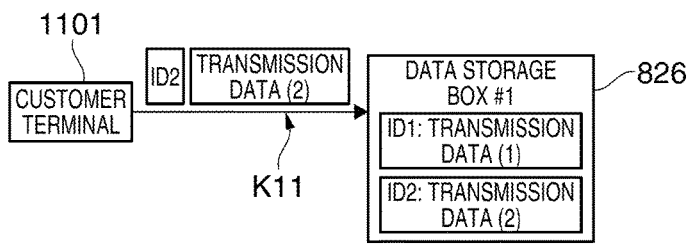
FIGS. 19A-19E illustrate processing a data storage box.
Figure 19B:
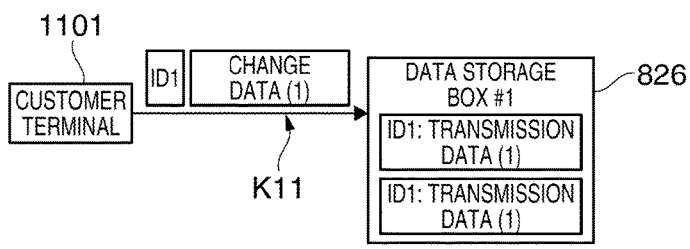
Figure 19C:
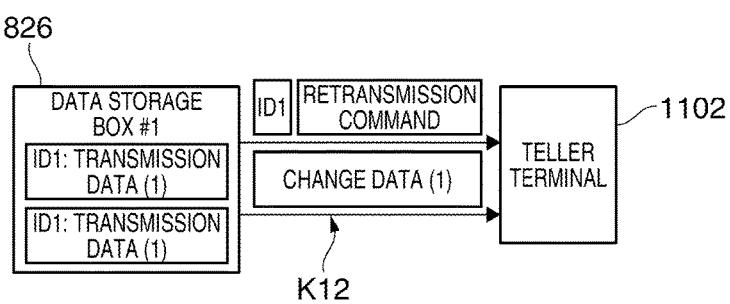
Figure 19D:
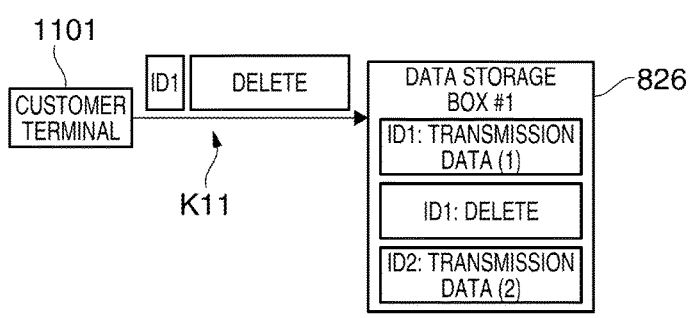
Figure 19E:
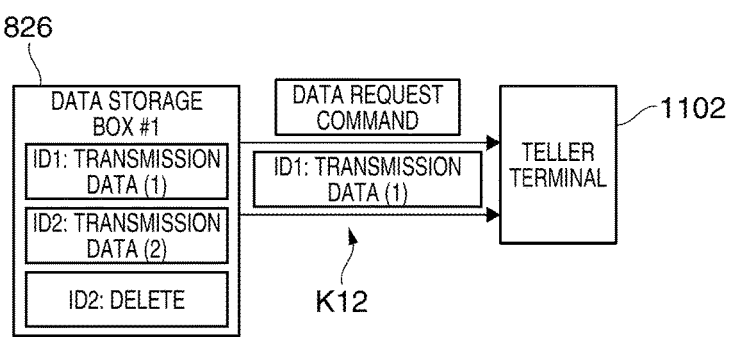

FIG. 18 illustrates the operation whereby data is communicated between the customer terminal 1101, the device server 818, and the teller terminal 1102. The relationship between the communication unit 820b and the data transmission unit 820d of the device control unit 820, the first browser execution unit 1261a, and the second browser execution unit 1262a is shown in FIG. 18 in a format appropriate to describing this operation.

In FIG. 18, the data storage boxes 826, box management object 828, and box objects 829 are shown as function blocks of the device control unit 820 of the host device 811. The data storage boxes 826 are storage areas created in RAM of the device control unit 820 or the storage unit 825. The box management object 828 and the box objects 829 use the communication function of the communication unit 820b, and the ability of the data transmission unit 820d to control the communication unit 820b.

The terminal information 827 in FIG. 18 is data generated by the box management object 828, and is stored with the data storage box 826 in the storage unit 825 or RAM. This embodiment of the invention describes an example in which the data storage box 826 is rendered in the storage unit 825, and the storage unit 825 stores the terminal information 827.

The box management object 828 and box object 829 are objects generated by the device control unit 820. The box management object 828 and box object 829 include a method for processing the terminal information 827 and data stored in a data storage box 826, and a method for communicating with the customer terminal 1101 and teller terminal 1102.

When the receiving system 8 boots up, or when the host device 811 has started and the first browser execution unit 1261a starts operating, the web application described above is run. This web application establishes a first path K11, which is a communication path for sending and receiving data, between the first browser execution unit 1261a and the device server 818. The first browser execution unit 1261a and the device server 818 open a connection using the WebSocket standard, and establish the first path K11, which is a software interface. The first path K11 is a WebSocket communication path that uses the Socket.io library, for example, but a different standard, such as Comet, may be used.

The web application is also run when the receiving system 8 boots up, or when the host device 811 has started and the second browser execution unit 1262a starts operating. The web application establishes a second path K12 between the second browser execution unit 1262a and the communication unit 820b of the device server 818. Like the first path K11, the second path K12 is a communication path based on a connection opened using the WebSocket standard.

The first path K11 and second path K12 use the server interface 832 as a physical communication path, and a wireless communication connection created by the server interface 832 with the customer terminal 1101 and the teller terminal 1102. More specifically, the server interface 832 of the host device 811 establishes the first path K11 and the second path K12 as controlled by the device server 818. The server interface 832 opening the first path K11 corresponds to a first connection unit, and the server interface 832 opening the second path K12 corresponds to a second connection unit.

A data storage box 826 is a storage area created in the storage unit 825. The number of data storage boxes 826 that can be created, and the amount of data that can be stored in a data storage box 826, are predetermined. A data storage box 826 also has identification information. One particular data storage box 826 can be identified using this identification information. The customer terminal 1101 or the host device 811 specifies the identification information of a data storage box 826 when creating the data storage box 826. The values #1, #2 and #3 are assigned as the identification information to the three data storage boxes 826 in the example shown in FIG. 18.

A data storage box 826 is related to a particular customer terminal 1101 and teller terminal 1102. Any number of control customer terminals 1101 and teller terminals 1102 may be related to one data storage box 826. One customer terminal 1101 may also be related to a plurality of data storage boxes 826, and one teller terminal 1102 may also be related to a plurality of data storage boxes 826.

The terminal information 827 is information relating a data storage box 826 to an customer terminal 1101 and a teller terminal 1102. The terminal information 827 identifies a particular customer terminal 1101 and the teller terminal 1102 by the ID assigned to the first path K11 and second path K12, the terminal name, or the network address (such as an IP address or MAC address) of the terminal, for example.

The box management object 828 manages the data storage boxes 826, terminal information 827, and box objects 829. The box management object 828 runs processes related to creating and deleting data storage boxes 826, terminal information 827, and box objects 829. The box management object 828 also creates a data storage box 826 in response to a request from the first browser execution unit 1261a or the second browser execution unit 1262a, and instantiates terminal information 827 and a box object 829 for the data storage box 826 that was created. A box object 829 is therefore created for each data storage box 826 as shown in FIG. 18.

The customer terminal 1101 can send data to a data storage box 826 related to the customer terminal 1101.

The customer terminal 1101 specifies the identification information of the data storage box 826 when transmitting data. The box management object 828 calls the box object 829 corresponding to the data storage box 826 specified by the identification information. The called box object 829 receives and stores the data in the data storage box 826.

The box object 829 references the terminal information 827 corresponding to the data storage box 826 that stored the data. The box object 829 then sends the data stored in the data storage box 826 to the teller terminal 1102 related by the terminal information 827. As a result, data can be pushed to the teller terminal 1102 set by the terminal information 827 even if the customer terminal 1101 does not specify the addressed teller terminal 1102.

The customer terminal 1101 can also specify and send data to a particular teller terminal 1102. In this event, the box object 829 sends the data to the specified teller terminal 1102. However, when the teller terminal 1102 specified by the customer terminal 1101 is not related to the data storage box 826 specified by the customer terminal 1101, the data is not sent. In addition, when the data storage box 826 specified by the customer terminal 1101 is not related to the customer terminal 1101, data is not stored in the data storage box 826.

When sending data stored in the data storage box 826 to the teller terminal 1102, the box object 829 adds the identification information of the data storage box 826. The second browser execution unit 1262*a* of the teller terminal 1102 can identify the data storage box 826 that stored the data when it receives data.

When the second browser execution unit 1262*a* receives data, it generates and outputs display data to display the received data to the display control unit 1282. The second browser execution unit 1262*a* generates the display data in the display format defined in the location information 1112. The location information 1112 may also include information indicating the position and size of the data when displayed on the display panel 1102*c*.

Note that all or part of the information contained in the location information 1112 may be previously stored on the device server 818 and sent to the teller terminal 1102. A configuration in which the customer terminal 1101 sends the location information 1112 to the device server 818, and the device server 818 sends the location information 1112 to the teller terminal 1102, is also conceivable.

The method whereby the device server 818 sends data to the teller terminal 1102 is not limited to push transmission. For example, the teller terminal 1102 may access the data storage box 826 at a preset time to receive data. A storage area that synchronizes with the data storage box 826 may also be disposed to the teller terminal 1102, and the box object 829 may control synchronizing data in this storage area of the teller terminal 1102 and the data storage box 826.

FIG. 19 illustrates operations performed by the customer terminal 1101 and teller terminal 1102 on the data storage boxes 826. The operation whereby the customer terminal 1101 transmits data in the following example is executed by the first browser execution unit 1261*a*. The operation of receiving and storing data is executed by the box management object 828 and box object 829 of the device control unit 820. The operation of the teller terminal 1102 when receiving data and when sending a command is executed by the second browser execution unit 1262*a*.

FIG. 19 (A) and FIG. 19 (B) illustrate the operation of the customer terminal 1101 sending data to a data storage box 826. As shown in FIG. 19 (A), the customer terminal 1101 sends data identification information and data to the data storage box 826. For example, the customer terminal 1101 adds and sends the value ID2 as the identification information to transmission data (2).

The box object 829 receives the data (transmission data (2) and the identification information (ID2) sent by the customer terminal 1101, and stores the received data (transmission data (2)) related to the identification information (ID2) in the data storage box 826. Data can be stored in the data storage box 826 up to the storage capacity of the data storage box 826. In the example shown in FIG. 19 (A), because the box object 829 receives transmission data (2) when transmission data (1) of ID1 is already stored in the data storage box 826, the transmission data (2) is additionally stored in the data storage box 826.

The data stored in the data storage box 826 can be identified by the identification information. The customer terminal 1101 can also declare identification information to update or delete specific data.

FIG. 19 (B) shows operation when the customer terminal 1101 changes data stored in the data storage box 826. When transmission data (1) of ID1 is stored in the data storage box 826, the customer terminal 1101 specifies the ID1 of the data to change and sends change data (1), which is the new data to store. The 829 receives and stores this ID1 and the change data (1) in the data storage box 826. The change data (1) of ID1 is stored additionally to the transmission data (1) of ID1 in the data storage box 826. The data storage box 826 does not overwrite the transmission data (1), and instead stores both the transmission data (1) and the change data (1).

FIG. 19 (C) illustrates operation when the teller terminal 1102 requests data transmission from the data storage box 826. The teller terminal 1102 sends a retransmission command requesting resending data together with the identification information of the data stored in the data storage box 826. The operation of sending the retransmission command is executed when the operator performs a particular operation on the teller terminal 1102. If the data the box object 829 sent to the teller terminal 1102 could not be normally received, the retransmission command is used at the teller terminal 1102 to request sending the data again.

When the teller terminal 1102 specifies ID1 and sends a retransmission command, the box object 829 resends the first data (the oldest data) of ID1 stored in the data storage box 826. In this example, the box object 829 sends change data (1) of ID1 to the teller terminal 1102. The transmission data (1) stored in the data storage box 826 is thus effectively replaced by the change data (1). However, because the original transmission data (1) is also stored in the data storage box 826, all data stored in the data storage box 826 could be referenced to determine the history of changes to the data. The data storage box 826 thus functions as a database that accumulates data that has been sent and received.

FIG. 19 (D) illustrates the operation whereby the customer terminal 1101 deletes data stored in the data storage box 826. When transmission data (1) of ID1 is stored in the data storage box 826, the customer terminal 1101 sends the ID1 of the data to delete with a command instructing deleting the data. The box object 829 receives and stores the ID1 and delete command in the data storage box 826. The data storage box 826 stores the delete command with ID1 additionally to the transmission data (1) of ID1. The transmission data (1) is not actually deleted from the data storage box 826, and both the transmission data (1) and the delete command are stored. In FIG. 19 (D), transmission data (2) with ID2 is also stored in the data storage box 826. In other words, the operation of deleting data in the data storage box 826 can be executed without limitation to the newest data. As shown in the example in FIG. 19 (D), transmission data (1), which is the old data, can be deleted after transmission data (2) is stored.

FIG. 19 (E) illustrates operation when the teller terminal 1102 requests data transmission from the data storage box 826. FIG. 19 (E) shows an example using a data request command that requests the first data stored in the data storage box 826. Unlike the retransmission command, the data request command does not require declaring the identification information of the data. The operation of sending the data request command is executed when the operator performs a particular operation on the teller terminal 1102.

When the teller terminal 1102 specifies ID1 and sends a data request command, the box object 829 sends the first data stored in the data storage box 826. In the example in FIG. 19 (E), transmission data (1) of ID1 and transmission data (2) of ID2 are stored. The newest data is transmission data (2). However, because a delete command with ID2 is stored, the transmission data (2) was effectively deleted. As a result, the box object 829 sends transmission data (1) of ID1 as the first data to the teller terminal 1102.

FIG. 19 describes an example in which the customer terminal 1101 specifies the identification information of data stored in the data storage box 826 to delete or change the data, but the teller terminal 1102 can obviously instruct deleting or changing data.

The box object 829 may also perform an authentication step when executing operations that store data sent by the customer terminal 1101 or teller terminal 1102 do the data storage box 826, and operations that delete or change data in the data storage box 826. The box object 829 determines if the customer terminal 1101 or teller terminal 1102 that sent data and a command to the data storage box #1 826 is related to the data storage box #1 826 by the terminal information 827. If the customer terminal 1101 or teller terminal 1102 is not related to the data storage box #1 826, the box object 829 can reject the data and command. In this event, the box management object 828 returns an error to the customer terminal 1101 or teller terminal 1102 that sent the data or command.

The customer service operation of the receiving system 8 is described next with reference to FIG. 20 and FIG. 21.

Figure 20:
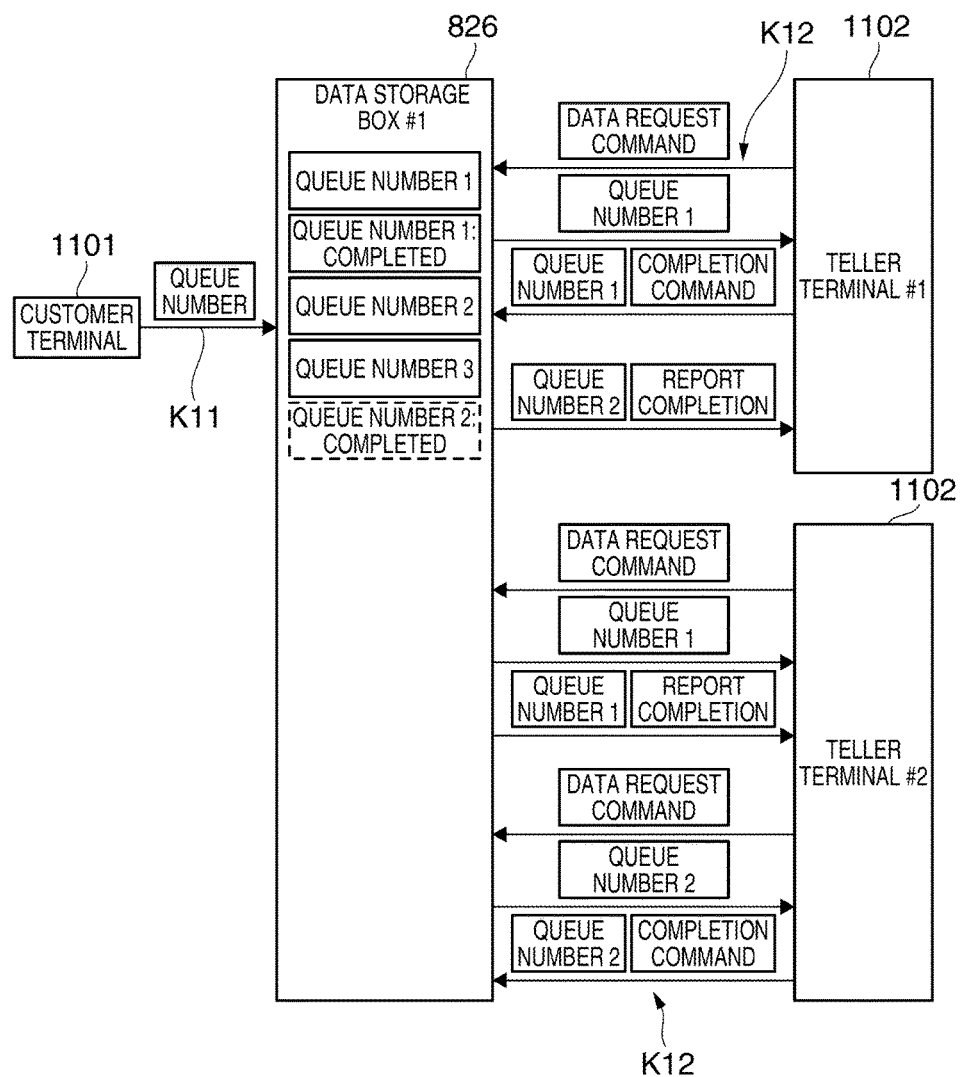
FIG. 20 illustrates the data communication operation in the receiving system.
Figures 21A, 21B, 21C, 21D:
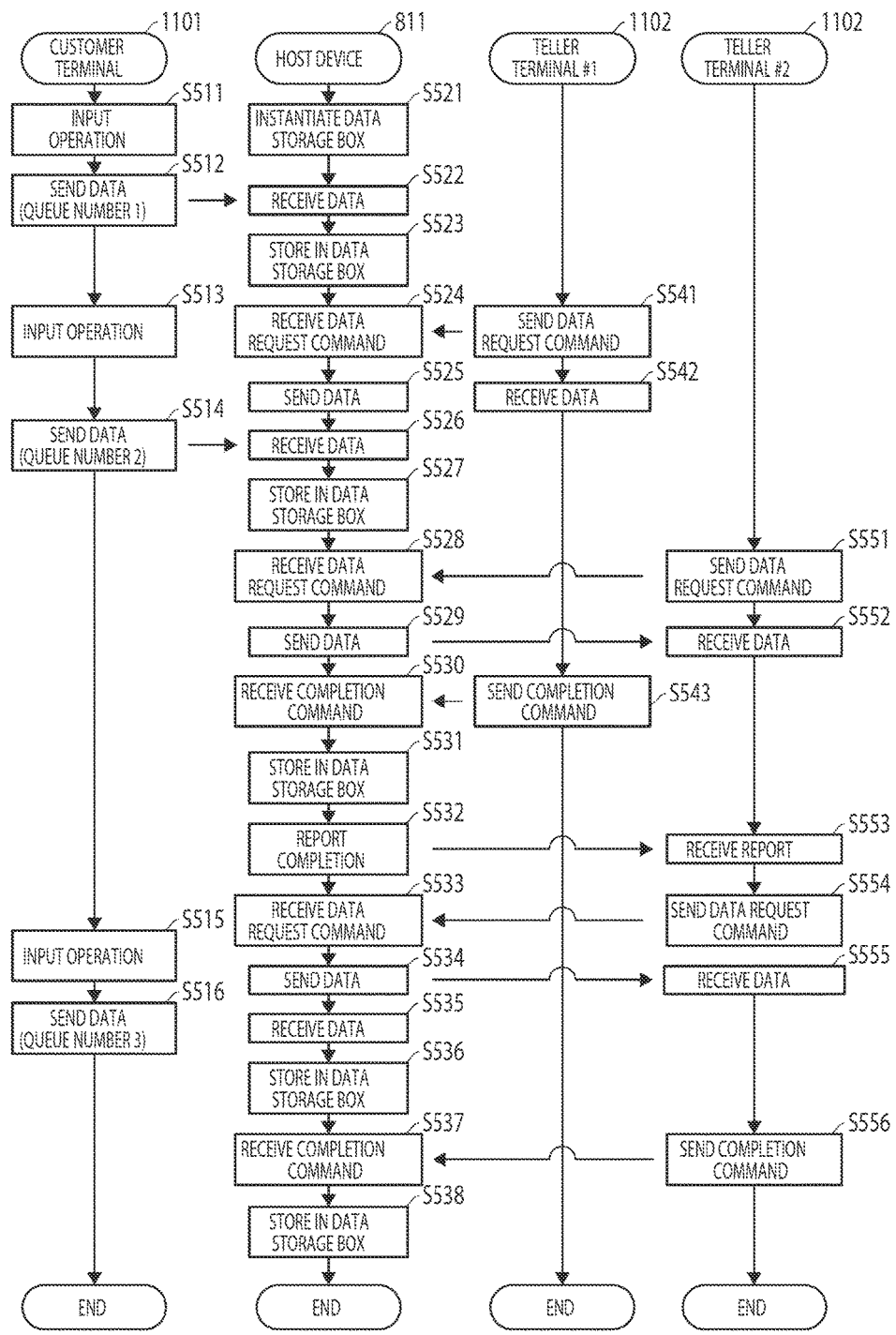
FIGS. 21A-21D show a flow chart illustrating the operation of devices in the receiving system.

FIG. 20 illustrates the data communication operation of the receiving system 8, and FIG. 21 is a flow chart showing the operation of devices in the receiving system 8. In the example described with reference to FIG. 20 and FIG. 21, one customer terminal 1101 is installed in the customer service area, and two teller terminals 1102 are installed at respective teller windows. To differentiate the two teller terminals 1102, the values #1 and #2 are assigned as identification information to the two teller terminals 1102.

In FIG. 21, column (A) shows the operation of the customer terminal 1101, (B) shows the operation of the host device 811, (C) shows the operation of teller terminal #1 1102, and (D) shows the operation of teller terminal #2 1102.

In this example, the customer terminal 1101 issues and sends a queue number to the data storage box 826 in response to a customer action, and when the teller terminal 1102 requests the data storage box 826 for a queue number, the data storage box 826 sends the queue number to the teller terminal 1102. Either teller terminal #1 1102 or teller terminal #2 1102 is an example of a receiving device, and the other is a second receiving device.

Before operation starts, the host device 811 creates a data storage box 826 as controlled by the box management object 828 (step S521). In this example, data storage box #1 826 is created, and the customer terminal 1101 and two teller terminals 1102 are related to this data storage box 826.

When the operator of teller terminal #1 1102 is able to serve a customer at the window and operates the teller terminal 1102, the teller terminal 1102 sends a data request command (step S541). The host device 811 receives the data request command (step S524), and sends queue number 1, which is the first data in the data storage box 826, to the teller terminal #1 1102 that sent the data request command (step S525). The teller terminal #1 1102 then receives the queue number 1 data sent from the host device 811 (step S542).

When a different customer then operates the customer terminal 1101 (step S513), the customer terminal 1101 generates and sends queue number 2 to the data storage box 826 (step S514). The host device 811 receives the queue number 2 data sent to the data storage box 826 (step S526) and stores the queue number 2 data in the data storage box 826 (step S527). As shown in FIG. 20, the new queue number 2 data is appended to the data storage box 826.

When the operator of teller terminal #2 1102 becomes able to serve a customer at the window and operates the teller terminal 1102, the teller terminal 1102 sends a data request command (step S551). The host device 811 receives the data request command (step S528), and sends queue number 1, which is the first data in the data storage box 826, to the teller terminal #2 1102 that sent the data request command (step S529). The teller terminal #2 1102 then receives the queue number 1 data sent from the host device 811 (step S552).

Teller terminal #1 1102 then determines the data of the received queue number 1 is to be processed based on an operator action or a function of the device control unit 820, and sends a completion command for queue number 1 to the data storage box 826 (step S543). The completion command is addressed to the data storage box 826 that sent the queue number 1 data.

The host device 811 then receives the queue number 1 completion command sent from the teller terminal 1102 (step S530), and stores the queue number 1 completion command in the data storage box 826 (step S531). As a result, as shown in FIG. 20, the queue number 1 completion command is stored in the data storage box 826, and processing of the data for queue number 1 is considered completed.

Because processing the queue number 1 data of the data storage box 826 ended, the box object 829 of the host device 811 reports completion of queue number 1 to the teller terminal #2 1102 (step S532). This completion notice is sent to the teller terminals 1102 to which the queue number 1 data was sent. The box object 829 can execute this operation if the identification information data for the teller terminal 1102 that sent data in response to the data request command and the transmitted data are temporarily stored. The teller terminal #2 1102 then receives this completion command (step S553), and discards the previously received queue number 1 data. Because there is no data for the teller terminal #2 1102 to process, a data request command is sent again by an action of the operator or a function of the device control unit 820 (step S554).

The host device 811 then receives the data request command (step S533). Because the queue number 1 data in the data storage box 826 has ended, the host device 811 sends queue number 2, which is now the first data in the data storage box 826, to the teller terminal #2 1102 that sent the data request command (step S534). The teller terminal #2 1102 then receives the queue number 2 data sent from the host device 811 (step S555).

When another customer then operates the customer terminal 1101 (step S515), the customer terminal 1101 generates and sends queue number 3 to the data storage box 826 (step S516). The host device 811 receives the queue number 3 data sent to the data storage box 826 (step S535) and stores the queue number 3 data in the data storage box 826 (step S536). As shown in FIG. 20, the new queue number 3 data is appended to the data storage box 826.

Teller terminal #2 1102 then determines the data of the received queue number 2 is to be processed based on an operator action or a function of the device control unit 820, and sends a completion command for queue number 2 to the data storage box 826 (step S556). The completion command is addressed to the data storage box 826 that sent the queue number 2 data.

The host device 811 then receives the queue number 2 completion command sent from the teller terminal 1102 (step S537), and stores the queue number 2 completion command in the data storage box 826 (step S538). As a result, as shown by the dotted line in FIG. 20, the queue number 2 completion command is stored in the data storage box 826, and processing of the data for queue number 2 is considered completed. The first data stored in the data storage box 826 therefore becomes the data for queue number 3.

This operation continues until all data in the data storage box 826 has been processed. When the operator of teller terminal #1 1102 or teller terminal #2 1102 finishes with one customer and is ready to take the next customer, the operator uses the teller terminal 1102 to send a data request command again. When all data in the data storage box 826 has been processed, the box object 829 may send to the teller terminal 1102 a report that there is no more data in response to a data request command.

When a completion command is received from a teller terminal 1102, the box object 829 may also report completion to the teller terminal 1102 that sent the completion command. The identification information data of the teller terminal 1102 that sent the completion command may also be included in the completion report.

As described above, the receiving system 8 according to the fourth embodiment of the invention has an customer terminal 1101, a teller terminal 1102, and a host device 811.

The teller terminal 1102 has a second browser execution unit 1262a that receives and processes data, and a communication unit 820b that sends a response command indicating the result of data processing by the second browser execution unit 1262a. The customer terminal 1101 sends data to the host device 811. The host device 811 has a server interface 832 that receives data sent by the customer terminal 1101, and sends data to the teller terminal 1102.

The host device 811 also has a storage unit 825 in which a data storage box 826 that stores data relationally to the customer terminal 1101 and teller terminal 1102.

The host device 811 also has a device control unit 820 that, when data sent by the customer terminal 1101 is stored in the data storage box 826, sends this data to the teller terminal 1102 related to the data storage box 826, and processes the data stored in the data storage box 826 according to the response command sent by the teller terminal 1102.

As a result, data received by the host device 811 from the customer terminal 1101 and stored in the data storage box 826 is sent to the teller terminal 1102 related to the data storage box 826. Data stored in the data storage box 826 is also processed according to the response command sent by the teller terminal 1102. As a result, data sent by the customer terminal 1101 can be easily forwarded to the teller terminal 1102. The correlation between the sending device and the receiving device can also be controlled with a high degree of freedom by relating the data storage box 826 and the teller terminal 1102. Data stored in the data storage box 826 can also be desirably processed, such as by resending or deleting the data, as requested from the teller terminal 1102, and user convenience can be improved.

When the device control unit 820 processes data stored in the data storage box 826 according to a response command sent from the teller terminal 1102, the device control unit 820 can report processing of the data to the teller terminal 1102.

The receiving system 8 also has a second teller terminal 1102, and the data storage box 826 is related to the second teller terminal 1102. When the second teller terminal 1102 sends a second response command, the device control unit 820 processes data stored in the data storage box 826 according to the second response command. As a result, when the receiving system 8 has a plurality of teller terminals 1102, data stored in the data storage box 826 can be processed according to a response command sent by any of the teller terminals 1102.

The response command has information related to the data. When a response command is received and data corresponding to the information related to the data of the response command is not stored in the data storage box 826, the device control unit 820 reports to the teller terminal 1102 that the specified data is not stored. The teller terminal 1102 can therefore be informed when the process data is not found, such as when data stored in the data storage box 826 has already been deleted according to a response command sent from a teller terminal 1102.

The response command may be an instruction to resend data, and the device control unit 820 may send data to the teller terminal 1102 according to the response command.

The response command may also be an instruction to delete data, and the device control unit 820 may delete data stored in the data storage box 826 related to the teller terminal 1102 from the data storage box 826 according to the response command.

Like the first to third embodiments described above, this fourth embodiment of the invention is simply a preferred embodiment of the present invention, and can be varied and adapted in many ways without departing from the scope of the invention.

For example, this fourth embodiment describes a configuration in which the device that transmits data stored in the data storage box 826 by the device control unit 820 is the teller terminal 1102, which is a tablet computer. The invention is not so limited, however. For example, the device to which the device control unit 820 sends data may be a printer or a device. In this event, the function unit that sends a command in response to user operation may be a separately provided device.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A transmission system comprising:
a data supply device, a transmission device, and at least one receiving device, wherein:
the data supply device is configured to transmit data; and
the transmission device is configured to:
    access a box management object;
    generate a box object using the box management object;
    render, using the box management object, a data storage box associated with the box object in computer memory accessible to the transmission device;
    generate, using the box management object, terminal information associated with the data storage box, the terminal information including identification information for the at least one receiving device and identification information for the data supply device;
    receive data sent by the data supply device, the data comprising identification information for the data storage box;
    call the box object corresponding to the data storage box using the received identification information to perform processes comprising:

storing the data in the data storage box; and
automatically retrieving, responsive to storing the data in the data storage box, the terminal information associated with the data storage box;
transmit, by push transmission, the stored data and identification information corresponding to the data storage box to the at least one receiving device based on the identification information for the at least one receiving device;
receive a report and the identification information corresponding to the data storage box from the at least one receiving device;
store, using the box object, the data in the data storage box based on the received identification information corresponding to the data storage box; and
transmit, using the box object and the terminal information, the report to the data supply device.

2. The transmission system described in claim 1, wherein: the transmission device is further configured to transmit to the data supply device a result report indicating the result of sending the data based on the report received from the at least one receiving device.

3. The transmission system described in claim 2, wherein: the at least one receiving device is configured to send the report to the transmission device along with the identification information corresponding to the data storage box.

4. The transmission system described in claim 2, wherein: the transmission system includes a second receiving device configured to receive data;
the terminal information associated with the data storage box includes additional identification information that identifies the second receiving device; and
the transmission device is further configured to transmit, by push transmission, the stored data to the second receiving device, based on the additional identification information.

5. The transmission system described in claim 1, wherein: the at least one receiving device comprises a process unit configured to receive and process the data transmitted from the transmission device, and a response command transmission unit configured to send a response command including the report, the report indicating the result of the process unit processing the data, to the transmission device; and
the transmission device is further configured to processes the data stored in the data storage box according to the response command received from the at least one receiving device.

6. The transmission system described in claim 5, wherein: the transmission device is further configured to report processing the data to the at least one receiving device when data stored in the data storage box is processed according to the response command sent by the at least one receiving device.

7. The transmission system described in claim 5, further comprising:
a second receiving device comprising a second process unit configured to receive and process data, and a second response command transmission unit configured to send a response command to the transmission device including a report indicating the result of the second process unit processing the data, wherein
the terminal information associated with the data storage box includes additional identification information that identifies the second receiving device; and
the transmission device is further configured to transmit, by push transmission, the stored data to the second receiving device, based on the additional identification information.

8. The transmission system described in claim 5, wherein:
the response command includes information related to the data transmitted from the transmission device; and
the transmission device is further configured to report to the at least one receiving device that the data is not stored when the response command is received and the data transmitted from the transmission device is not stored in the data storage box.

9. The transmission system described in claim 5, wherein:
the response command is an instruction to resend the data; and
the transmission device is further configured to send the data to the at least one receiving device according to the response command.

10. The transmission system described in claim 5, wherein:
the response command is an instruction to delete the data; and
the transmission device is further configured to delete the data stored in the data storage box associated with the at least one receiving device from the storage box according to the response command.

11. The transmission system described in claim 1, wherein:
the at least one receiving device comprises a reception unit configured to receive the data, a process unit configured to process the data received by the reception unit, and a transmission unit configured to send result data in the report which reports the result of the process unit processing the data, to the transmission unit; and
the transmission device is further configured to receive the result data from the receiving device and send, based on the identification information for the data supply device, the result data to the data supply device.

12. The transmission system described in claim 11, wherein:
the transmission device is further configured to transmit the result data as a process result of the data to the data supply device when the result data is received after the data stored in the data storage box is sent to the at least one receiving device.

13. The transmission system described in claim 11, wherein:
the data supply device is configured to specify the data storage box and send the data; and
the transmission device is further configured to send the result data to the data supply device when the result data is stored in the data storage box.

14. The transmission system described in claim 11, further comprising:
a second receiving device comprising a second process unit configured to receive and process the data received from the transmission device;
the terminal information associated with the data storage box includes additional identification information that identifies the second receiving device; and
the transmission device is further configured to transmit, by push transmission, the stored data to the second receiving device, based on the additional identification information.

15. The transmission system described in claim 1, wherein:

the at least one receiving device is configured to receive the data and execute a process; and the transmission device is further configured to determine that data received from the data supply device specifies the data storage box, and to responsively store the received data in the specified data storage device.

16. The transmission system described in claim 15, further comprising:

a second receiving device configured to receive and process the data; wherein the terminal information associated with the data storage box includes additional identification information that identifies the second receiving device; and the transmission device is further configured to transmit, by push transmission, the stored data to the second receiving device, based on the additional identification information.

17. The transmission system described in claim 1, wherein:

the data supply device is configured to transmit a command to the transmitting device instructing instantiating a data storage box to store transmitted data;

the transmission device comprises a data communication unit configured to receive the command; and the transmission device is further configured to instantiate the data storage box that stores the data sent from the data supply device responsive to receiving the command.

18. The transmission system described in claim 17, wherein:

the data storage box of the transmission device is associated with the identification information for the data storage box that identifies the data storage box; and the at least one receiving device comprises a reception unit configured to receive the data sent by the transmission device, and a process unit configured to process the data received by the reception unit;

wherein the data received by the receiving device includes the identification information for the data storage box.

19. A data transmission method, comprising:

accessing a box management object;

generating a box object using the box management object;

rendering, using the box management object, a data storage box associated with the box object in computer memory;

generating, using the box management object, terminal information associated with the data storage box, the terminal information including identification information for at least one receiving device and identification information for an external data supply device;

receiving data from the external data supply device, the data comprising identification information for the data storage box;

calling the box object corresponding to the data storage box using the received identification information to perform processes comprising:

storing the received data in the data storage box; and automatically retrieving, responsive to storing the data in the data storage box, the terminal information associated with the data storage box;

transmitting, by push transmission, the stored data and identification information corresponding to the data storage box to the at least one receiving device based on the identification information for the at least one receiving device;

receiving a report and the identification information corresponding to the data storage box from the at least one receiving device;

storing, using the box object, the data in the data storage box based on the received identification information corresponding to the data storage box; and transmitting, using the box object and the terminal information, the report to the data supply device.

* * * * *